United States Patent
Spencer et al.

(10) Patent No.: US 9,003,488 B2
(45) Date of Patent: Apr. 7, 2015

(54) SYSTEM AND METHOD FOR REMOTE DEVICE RECOGNITION AT PUBLIC HOTSPOTS

(71) Applicant: Datavalet Technologies, Montreal (CA)

(72) Inventors: Ron Spencer, Ottawa (CA); Tom Camps, Stittsville (CA); Chris Burchett, Ottawa (CA); Brad Gagne, Kanata (CA); Rob Madge, Kanata (CA); Ray Scobie, Stittsville (CA)

(73) Assignee: Datavalet Technologies, Montreal (CA)

( * ) Notice: Subject to any disclaimer, the term of this patent is extended or adjusted under 35 U.S.C. 154(b) by 327 days.

(21) Appl. No.: 13/666,784

(22) Filed: Nov. 1, 2012

(65) Prior Publication Data

US 2013/0167196 A1    Jun. 27, 2013

Related U.S. Application Data

(63) Continuation-in-part of application No. 12/451,909, filed as application No. PCT/CA2008/001060 on Jun. 6, 2008, now abandoned.

(60) Provisional application No. 60/942,409, filed on Jun. 6, 2007.

(51) Int. Cl.
```
G06F 7/00      (2006.01)
H04W 8/18      (2009.01)
H04W 12/06     (2009.01)
H04W 8/22      (2009.01)
```

(52) U.S. Cl.
CPC ............. *H04W 8/18* (2013.01); *H04W 12/06* (2013.01); *H04W 8/22* (2013.01)

(58) Field of Classification Search
USPC ............... 726/3, 4, 5, 26; 713/168; 709/227; 380/229, 236, 247, 270
See application file for complete search history.

(56) References Cited

U.S. PATENT DOCUMENTS

| | | | |
|---|---|---|---|
| 7,266,383 B2 * | 9/2007 | Anderson | 455/518 |
| 7,546,276 B2 * | 6/2009 | Randle et al. | 705/65 |
| 7,610,049 B2 * | 10/2009 | Watanabe | 455/436 |
| 7,974,946 B2 * | 7/2011 | Meesseman | 707/621 |
| 8,024,567 B2 * | 9/2011 | Han | 713/168 |
| 8,151,319 B2 * | 4/2012 | Dhand et al. | 726/3 |
| 8,166,524 B2 * | 4/2012 | Sentinelli | 726/5 |
| 8,391,909 B2 | 3/2013 | Stewart | |
| 2002/0103801 A1 | 8/2002 | Lyons | |
| 2002/0173981 A1 | 11/2002 | Stewart | |
| 2002/0176579 A1 * | 11/2002 | Deshpande et al. | 380/270 |

(Continued)

FOREIGN PATENT DOCUMENTS

WO    WO 2003/077572 A1    9/2003

OTHER PUBLICATIONS

U.S. Appl. No. 14/460,634, filed Aug. 15, 2014, Camps et al.

*Primary Examiner* — Beemnet Dada
*Assistant Examiner* — Sayed Beheshti Shirazi
(74) *Attorney, Agent, or Firm* — Knobbe, Martens, Olson & Bear, LLP

(57) ABSTRACT

Described are various embodiments of a system and method in which device-identifying data can be used to uniquely recognize and optionally track and report on device activity at one or more hotspot locations by way of the creation and management of a device profile uniquely associated with such devices and stored in a network accessible knowledge base.

45 Claims, 19 Drawing Sheets

(56) References Cited

U.S. PATENT DOCUMENTS

| | | |
|---|---|---|
| 2003/0233458 A1* | 12/2003 | Kwon et al. .................. 709/227 |
| 2004/0181692 A1* | 9/2004 | Wild et al. ................... 713/201 |
| 2005/0015432 A1 | 1/2005 | Cohen |
| 2005/0021781 A1* | 1/2005 | Sunder et al. ................ 709/229 |
| 2005/0053296 A1* | 3/2005 | Srinivasan et al. ........... 382/236 |
| 2005/0216300 A1 | 9/2005 | Appelman et al. |
| 2006/0053296 A1 | 3/2006 | Busboom et al. |
| 2006/0182045 A1* | 8/2006 | Anderson .................... 370/260 |
| 2006/0265507 A1 | 11/2006 | Banga et al. |
| 2007/0006291 A1 | 1/2007 | Barari et al. |
| 2007/0113269 A1* | 5/2007 | Zhang ............................... 726/4 |
| 2008/0039102 A1 | 2/2008 | Sewall et al. |
| 2009/0064283 A1* | 3/2009 | Chen ................................. 726/4 |
| 2009/0070412 A1 | 3/2009 | D'Angelo et al. |
| 2010/0107225 A1* | 4/2010 | Spencer et al. ................... 726/4 |
| 2010/0241652 A1 | 9/2010 | Fasihuddin et al. |
| 2010/0306099 A1 | 12/2010 | Hirson et al. |
| 2011/0137814 A1 | 6/2011 | Stewart |
| 2012/0192258 A1 | 7/2012 | Spencer et al. |

* cited by examiner

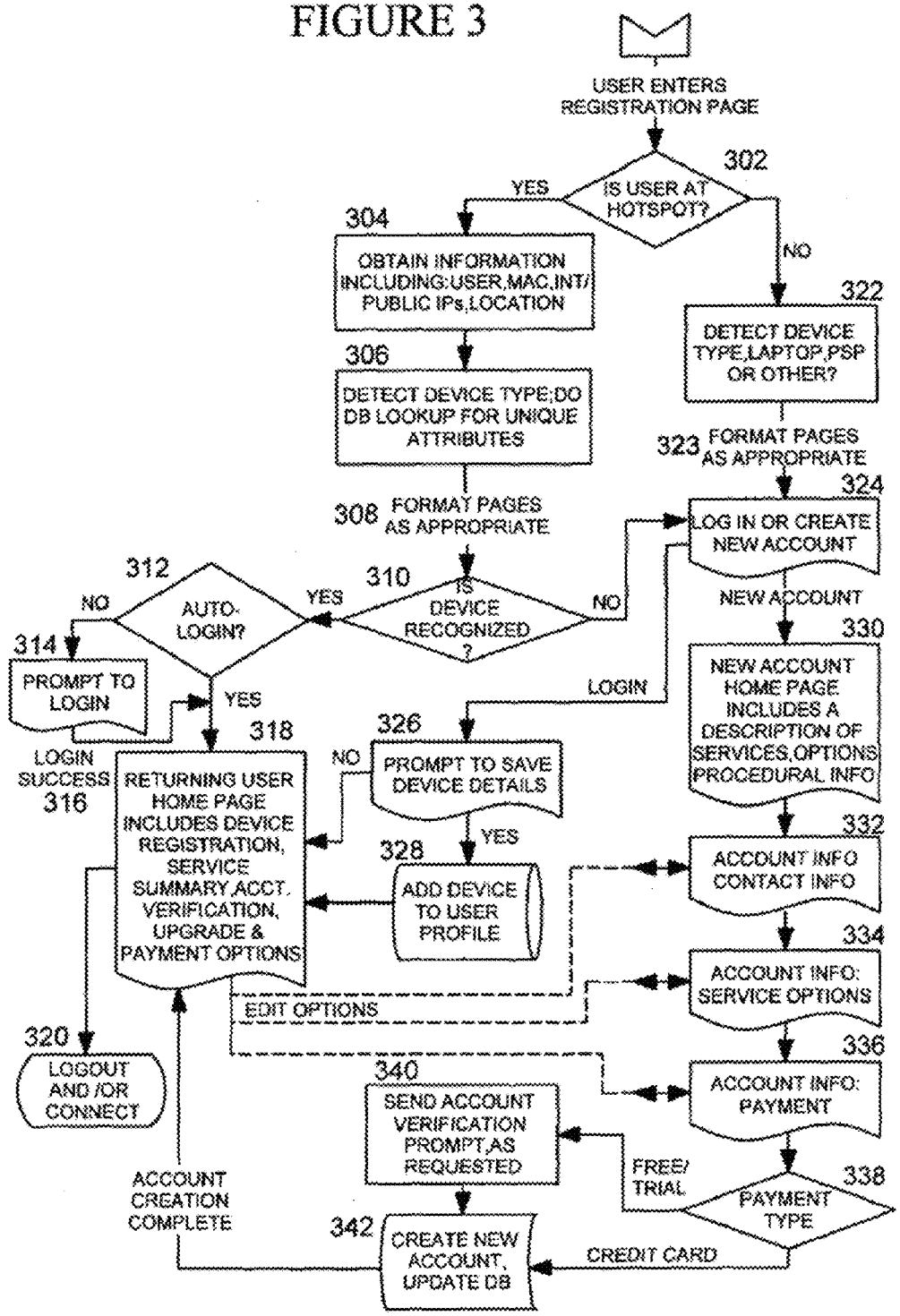

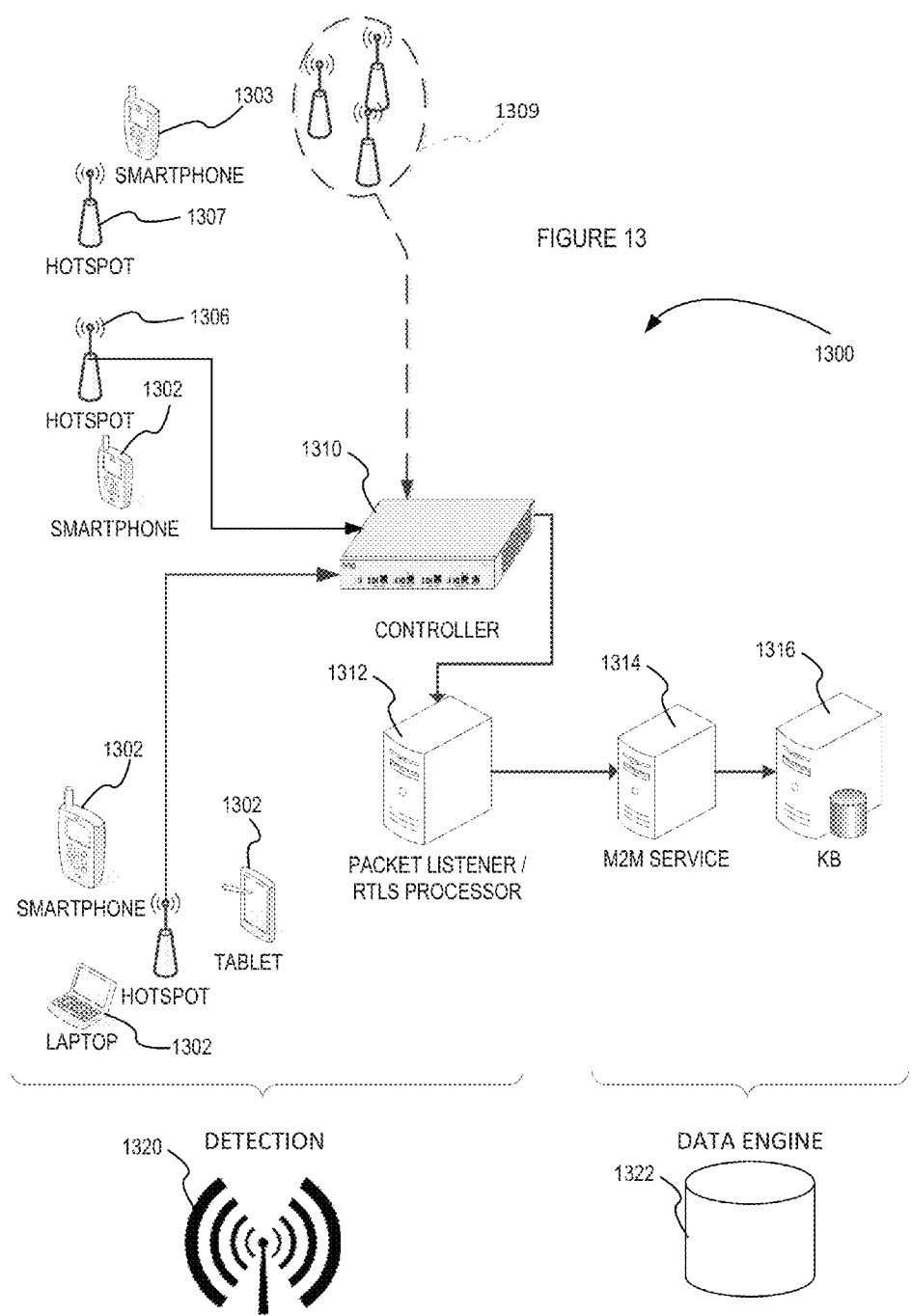

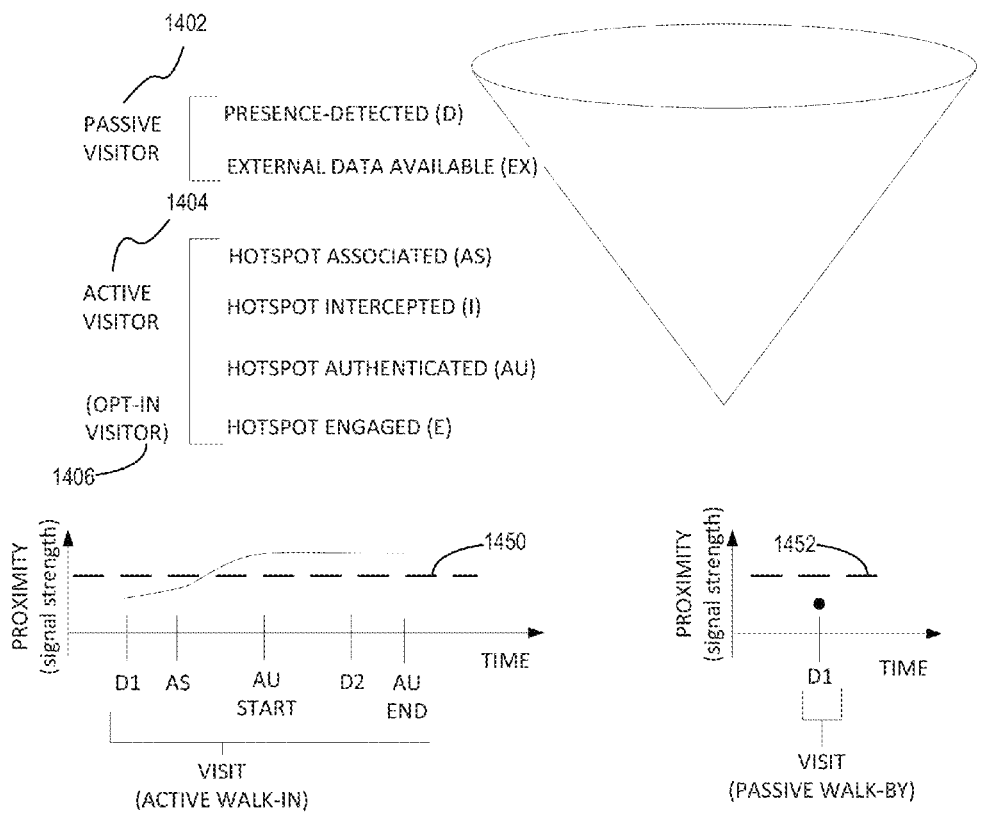
FIGURE 14A
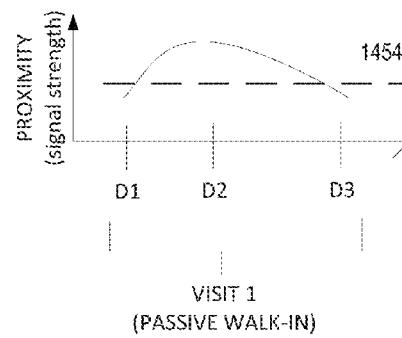
FIGURE 14B
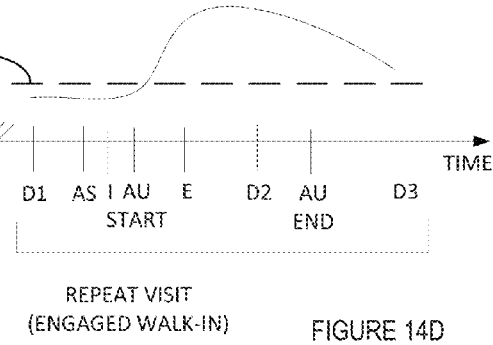
FIGURE 14C
FIGURE 14D

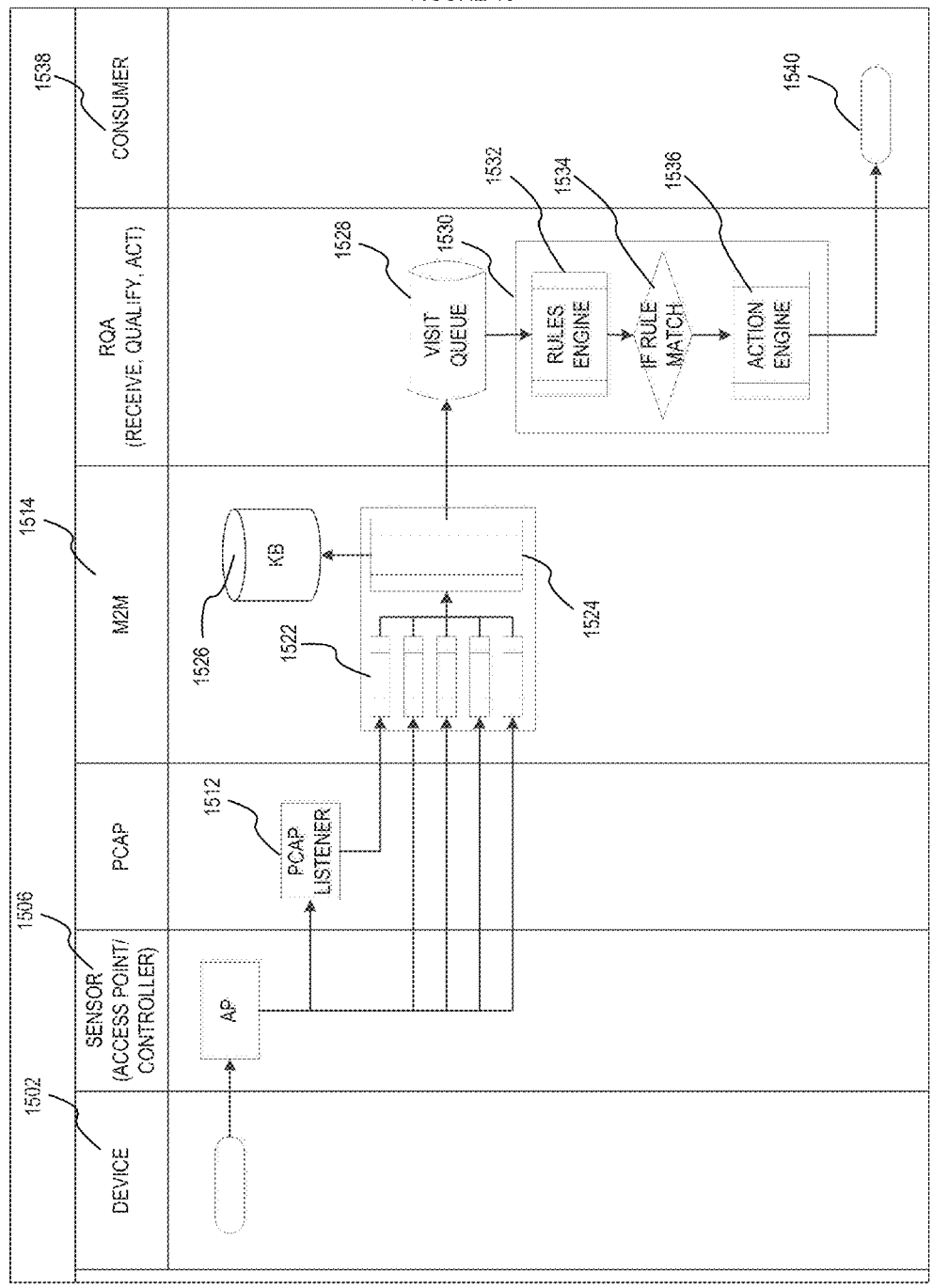

SYSTEM AND METHOD FOR REMOTE DEVICE RECOGNITION AT PUBLIC HOTSPOTS

CROSS REFERENCE TO RELATED APPLICATIONS

This application is a continuation-in-part of U.S. patent application Ser. No. 12/451,909, filed on Jan. 7, 2010, which is a U.S. National Phase of International Application No. PCT/CA2008/001060, filed on Jun. 6, 2008, which claims priority to a U.S. Provisional Patent Application No. 60/942,409, filed on Jun. 6, 2007. The disclosures of these prior applications are incorporated by reference in their entirety and should be considered a part of this specification.

FIELD OF THE DISCLOSURE

The present disclosure relates to wireless networks, and in particular, to a system and method for remote device recognition.

BACKGROUND

Wireless devices and systems are currently available for enabling a user of a remote device access to a communication network (e.g. the Internet) via a wireless access point (WAP) and gateway communicatively linked to this communication network, for example, operated at a given location or in a given area commonly known as a hotspot.

There remains a need for a new system and method for remote device recognition that overcomes some of the drawbacks of known techniques, or at least, provides the public with a useful alternative.

This background information is provided to reveal information believed by the applicant to be of possible relevance. No admission is necessarily intended, nor should be construed, that any of the preceding information constitutes prior art.

SUMMARY

Some aspects of this disclosure provide a system and method for remote device recognition. In accordance with one embodiment of the invention, there is provided a method for recognizing a wireless device across multiple hotspot locations, the method comprising: detecting at one of the multiple hotspot locations a wireless transmission sent by the wireless device; extracting a unique device identifier of the detected device from said wireless transmission, said unique device identifier automatically embedded within said wireless transmission by the detected device without user input; cross-referencing said extracted device identifier with a network accessible database of stored device profiles, each of said device profiles having a respective stored device identifier associated therewith; and recognizing the detected device upon matching said extracted device identifier with one said stored device identifier; otherwise automatically creating a new device profile in said database as a function of said extracted device identifier such that the device is recognized upon subsequent detection at any of said multiple hotspot locations.

In accordance with another embodiment, there is provided a system for tracking wireless devices across multiple hotspot locations, the system comprising: a network accessible database having stored therein a plurality of device profiles each identifying a respective wireless device by a stored unique device identifier, each said stored unique device identifier indicative of an inherent characteristic of said respective device; and a network access module at each of said locations and configured to detect at a given location a wireless transmission sent from a given device and having embedded therein a transmitted unique device identifier inherent to said given device; said network access module interfacing with said network accessible database to cross-reference said transmitted unique device identifier with said plurality of device profiles to identify a matching profile and thereby recognize said given device, and otherwise automatically create a new device profile based on said transmitted unique device identifier so to recognize said given device upon subsequent detection at any of said multiple hotspot locations.

In accordance with another embodiment, there is provided method for automatically characterizing a device visit at a Wi-Fi hotspot location, comprising: detecting a first wireless transmission sent by a wireless device; extracting a unique device identifier of the detected device from said wireless transmission, said unique device identifier automatically embedded within said wireless transmission by the detected device without user input; creating a device visit profile and associating said extracted unique device identifier therewith; recording a timestamp of said first wireless transmission in said device visit profile; automatically identifying one or more subsequent wireless transmissions sent by said wireless device while at the Wi-Fi hotspot location by way of identifying data associated with each of said subsequent transmissions directly or indirectly associated with said unique identifier; recording a timestamp of each of said subsequent transmissions in said device visit profile; and characterizing said device visit profile at least as a function of a duration value defined by said recorded timestamp of said first transmission and a recorded timestamp of a last of said subsequent transmissions.

In accordance with another embodiment, there is provided a method for recognizing a wireless device across multiple Wi-Fi locations, the method comprising: detecting at one of the multiple Wi-Fi locations a wireless transmission sent by the wireless device; extracting a unique device identifier of the detected device from said wireless transmission, said unique device identifier automatically embedded within said wireless transmission by the detected device without user input; cross-referencing said extracted device identifier with a network accessible database of stored device profiles, each of said device profiles having a respective stored device identifier associated therewith; recognizing the detected device upon matching said extracted device identifier with one said stored device identifier; and associating with said device profile of said recognized device said one of the multiple Wi-Fi locations; and centrally compiling from said stored device profiles, visit data for each of said multiple Wi-Fi locations.

Other aims, objects, advantages and features will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 3 is a flow diagram depicting a method of registering a user and a remote device for access to the system of FIG. 1, in accordance with embodiments of the invention;

FIG. 13 is a diagram of an exemplary system hardware architecture for device detection and recognition, in accordance with one embodiment of the invention;

FIG. 14A is a high-level diagram depicting progressively increasing engagement levels between a wireless device and a hotspot, and distinguishing passive and active visitors at this hotspot as a function of their engagement level, in accordance with an embodiment of the invention;

FIGS. 14B to 14D are diagrammatic representations of respective visit profiles, in accordance with an embodiment of the invention, in which different device detection and network interaction events are used to characterize each visit.

FIG. 15 is a diagram of an exemplary process flow for device detection, and recognition, visit data compilation and processing related thereto, and downstream applications associated therewith, in accordance with one embodiment of the invention;

DETAILED DESCRIPTION

Figure 1:
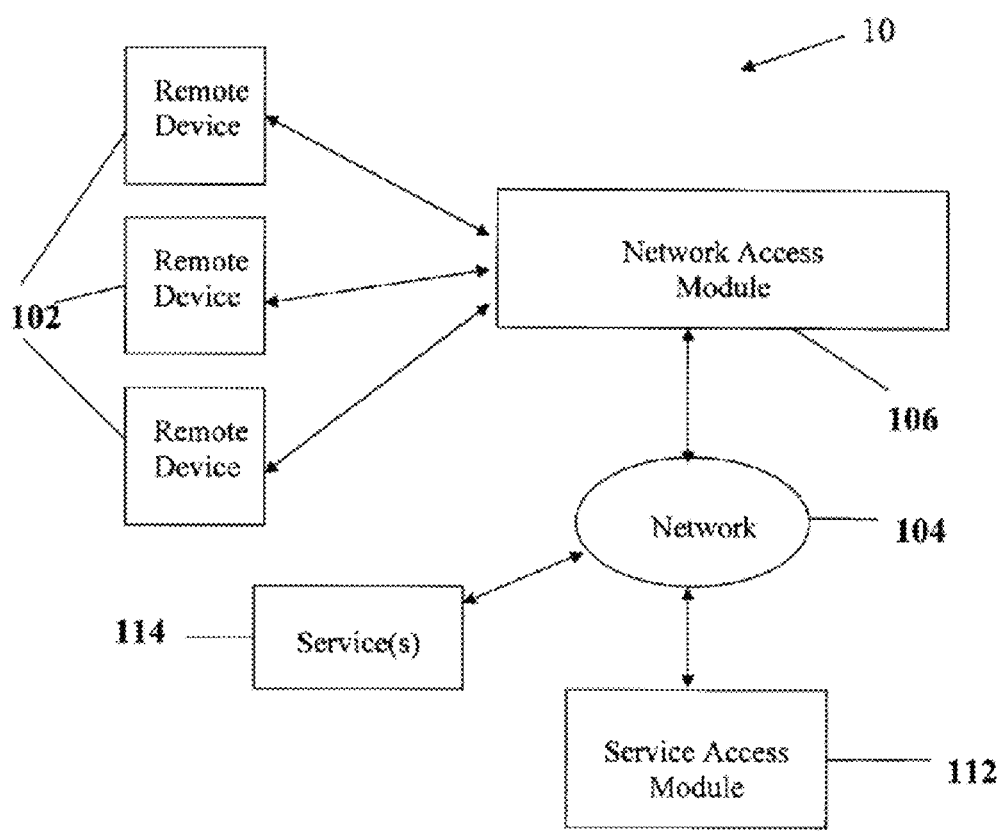
FIG. 1 is a high level diagrammatic representation of a remote service access system, in accordance with embodiments of the invention.

With reference to FIG. 1, and in accordance with one embodiment, a public network access system will now be described. The system 10 is configured to provide one or more remote devices 102 access to one or more services 114 via a network 104. In the embodiment depicted in FIG. 1, the system generally comprises one or more network access modules 106, adapted for communicating wirelessly with the one or more remote devices 102, and one or more service access modules as in module 112, communicatively linked to the network access module(s) 106 and configured to provide to the remote device(s) 102 access to the service(s) 114 via the network access module(s) 106 and network 104.

In general, the system 10 may be used to identify different remote devices 102 via the network access module 112, and in some embodiments, authenticate and authorize access thereto to network and/or Web-based services accessible via the service access module 106. In some embodiments, the system 10 allows browser-based, browser-challenged, and/or browserless remote devices to access these services, or a selection thereof, when such remote devices are operated at a public access hotspot supported by the system 10.

For example, the network access module 106 may be configured for receiving identifying data from a remote device 102, and communicating this identifying data to the service access module 112 for authentication and authorization. Once the identifying data is authenticated, the service access module 112 will authorize that the remote device 102 access the network 104 and services 114 provided therethrough. In some embodiments of the invention, the system 10 may be configured to provide full access to each remote device 102, or again each remote device type, or provide restricted access to selected services 114 based on user information, remote device owner or type information, service provider information, related purchase information, service promotions offered by service provider partnerships or agreements, and/or a combination of the above and other such information available through the system 10. Identifying data may, for example, comprise remote device type data automatically embedded within remote device transmissions and extracted by the system 10, remote device type data extracted from user preferences available from the remote device, user data input thereby using a user interface (e.g. username and password, etc.), or a combination thereof, to name a few.

In some embodiments, user information or data resides or is entered or stored on the remote device and is compared to a user profile stored in a knowledge base operatively coupled to the service access module. In some embodiments, as an aid to authentication, at least a portion of user information is not stored on the remote device but is provided by the user when access is required. Similarly, in some embodiments, remote device information or data resides or is stored on the remote device and is compared to a remote device profile stored in a knowledge base operatively coupled to the service access module. Remote device information can be indicative of inherent characteristics of the remote device, such as a MAC address, or can be other information stored on the remote device for identification thereof.

Authorization or restriction of access to selected services can be enabled by establishing one or more service profiles. A service profile can associate information about users, remote devices, hotspot providers, hotspot locations, or service providers, or a combination thereof with a collection of allowed or restricted services, resources or applications to be provided. For example, the service profile can include information about services which a user has paid for and subscribed to, services usable by a remote device, and/or services offered by a hotspot provider, hotspot location, or service provider. As another example, the service profile can additionally include information about service offerings provided to specified combinations of user, remote device, hotspot provider, hotspot location, and service provider. Service profiles can be stored in a knowledge base, and accessed to determine what access should be given upon initiation of a connection of a remote device at a hotspot.

In some embodiments, the user profile and/or remote device profile are associated with the service profile in the knowledge base. During authentication and authorization, user and/or remote device information provided by the remote device is compared with the user profile and/or remote device profile in the knowledge base for validation, and access to services as described by the service profile are granted upon validation.

In one embodiment, authorization constraints can be associated with a service profile and used to directly or indirectly limit or disable specified applications, or to limit or disable network access functionality related to said specified applications. Authorization whitelists can also be used, as an alternative to or in conjunction with authorization constraints, to positively define access to services or to provide minimum service level guarantees.

The system 10 generally provides one or more remote devices 102 access to one or more services 114 via network 104. For example, the system 10 could be used to provide access to digital home services, such as access to digital TV or other forms of home content to access applications such as, but not limited to, Slingbox, Orb, Location Free TV (LFTV), and/or home security features provided by various online home security service providers. A user could thus connect to a home access system (e.g. a home media server, networked computer, etc.) to access images, music, videos, files, and the like that are stored on remote devices located in the user's home, business, office, etc. The system 10 could also be used to access remote media services, for example from another remote device 102 supported by the system 10, from a Web-enabled media service provider (e.g. music and/or video download, sharing, etc.), or from other such networked services.

Other examples of services 114 could include access to instant messaging services, such as but not limited to, AOL™ Instant Messenger, Microsoft™ MSN Messenger™, Yahoo!™ Messenger, ICQ, or Google™ Talk, access to various public, private and/or enterprise email services, such as but not limited to, Hotmail, Gmail, Yahoo!™ Mail, AOL™ Mail, Microsoft™ Outlook™, as well as access to enterprise business applications such as, but not limited to, collaborative platforms using, for example, Microsoft™ Unified Communications (e.g. Outlook™, Messenger, Sharepoint™, Microsoft™ Communications VoIP services, etc.), and the like. Access could also be provided to social networking applications such as Facebook™ MySpace™ and YouTube™. Access could also be provided to cloud storage systems such as SkyDrive™ and Google Docs™, or other virtualized computing resources. Furthermore, access to various gaming services, such as OGSi, GamePal™ PlayStation™ Network, Xbox™ Live™, Nintendo™ Wi-Fi, and the like, could also be implemented via system 10.

In some embodiments, services can be characterized at least in part as allowing access to groups of applications, and/or as allowing access to specified network resources at specified levels. For example, network resources can include sets of one or more TCP or UDP ports, data transmission or reception capabilities at a specified bandwidth, bandwidth variation, delay, delay variation, communication priority, support for specified sources or destinations, application or removal of packet size restrictions, and the like, as applied to either upstream traffic, downstream traffic, or a combination thereof. Specified network protocols, for example protocols supporting streaming video or audio, can also be considered network resources.

In some embodiments, services characterized by allowing access to groups of applications and/or specified network resources or levels thereof can be further characterized by other aspects, such as allowing access to specified applications, to specified remote devices or at specified locations, times, or the like.

In some embodiments, network resources such as described above can be selectively allowed or blocked in order to enable or disable access to one or more selected applications. For example, if a customer subscribes to a streaming audio application, access to appropriate TCP ports, streaming audio servers, and network traffic characteristics representative of streaming audio can be allowed such as support the streaming audio application. However, communication with streaming video servers may optionally be blocked unless the customer pays an additional fee. Applications and/or groups of applications can be profiled to associate therewith the network resources or characteristics required for access thereto. Service providing access to selected applications can then be enabled by allowing access to the network resources or characteristics associated therewith, for example by looking up the appropriate associations in a knowledge base.

It will be appreciated by the person skilled in the art that access to any one, or combination of the above, and other such services may be provided to a user of the system 10, without departing form the general scope and nature of the present disclosure. For example, a user could gain access to the Internet, or similar network structures, on an open access basis, such that this user could browse the Internet, download from the Internet, play online games, etc., in one example, restricted only by possible functional, processing and/or communication capabilities and limitations of the user's remote device 102. Alternatively, access could be limited to services selected or pre-selected for a given user or user remote device, identified and authenticated by the service access module 112 and authorized to access these limited services via the network access module 106.

As introduced above, in accordance with some embodiments of the invention, the system 10 may be configured to manage public and/or private network access for a plurality of remote devices 102, optionally of a plurality of remote device types, configurations and/or functionality, and that, within a variety of venues if necessary. In this embodiment, identification, authentication and authorization can be implemented for a variety of remote devices and/or users, and optionally, for different services and service access packages and/or restrictions. Such packages could, in various embodiments, be defined by the type of remote device used to access the system 10, e.g. based on remote device capabilities, functionality and/or limitations; the specific user or remote device accessing the system 10, e.g. based on a user and/or remote device profile listing selected and/or pre-selected services; or a combination thereof, for example.

For instance, in one embodiment, access is provided in accordance with a selected or identified service access package wherein access is provided to one or more Value Based Applications (VBAs) selected or offered to a given user and/or remote device. For example, VBAs can be offered either at no cost or as part of a paid service. Such VBAs may include a number of remotely operable applications or service levels for which an end user may wish to gain access via the present system. For example, a VBA could comprise a specific application to which access is provided via a mobile network, managed by remote device and/or network specific functionality, and priced according to the value delivered by the specific application to a specific market segment. As another example, a VBA could comprise enabling a combination of capabilities and/or service quality levels that are desired for effectively using a specific application or class of applications, priced according to the value delivered thereby. Pricing can include monetary payment, but can also be affected by other factors such as purchases of related products, services or service contracts, association with a selected service provider, or the pre-existence of other related products, services or service contracts.

Enabling VBAs may thus provide access and cost flexibility to the end user through specifically defined service profiles. These service profiles can be packaged into a monetized service based on a specific functionality, for example, gaming, home connect, etc., and tied to the remote devices that support such functionality. Furthermore, an embodiment can be configured to enable the identification of a remote device 102 as a browser-based, browser challenged, or browserless remote device, and optionally configured to combine such remote device identification with user identification. Embodiments can allow for access to the network 104 and services 114 using a service-based accounting, which permits users with browserless remote devices to access these networks 104, and can also facilitate service-oriented network access at hotspots and other such locations.

In some embodiments, a user can select and pre-pay for a service profile based on price and desired functionality. Options to upgrade a service profile can be provided, triggered by a user's attempt to access a service other than described in their service profile, or to access a service in a manner other than described in their service profile (for example but not limited to: beyond a predetermined time limitation, outside of authorized hotspots, outside of a predetermined geographic area, using an unauthorized remote device or remote device type, accessing an unauthorized application, simultaneously using more remote devices than is authorized, or using resources beyond a predetermined bandwidth cap or bit cap). It will be understood that a variety of pre-paid or pay-as-you-go service plans can be implemented in some embodiments.

As examples of enabling restricted access to selected VBAs, a user may be willing to pay a fraction of the traditional hotspot access price for a specific function or application, for example, offering, at a discounted price, to only connect a given user to their home computer, watch TV from their home digital cable box, access a social application such as Facebook™, or keep a son or daughter entertained at the airport during a 3-hour layover with a hand-held gaming remote device connected to other players on the Internet. In an embodiment where such authorization packages are selected, the system 10 can be configured to manage user accounts and apply customized authorization rules, such as whitelists or constraints (e.g. firewall rules via gateway 110 of the network access module 106 of FIG. 2C) such that a user may select only services 114 they wish to pay for, or free services provided at their location, which for example could be in conjunction with the purchase of another product at the location or a service partnership or agreement, and be restricted thereto. An upsell feature may also be implemented through the system 10 such that a user may choose to upgrade their service profile to gain access to further services 114.

As another example, quality of service, packet priority, bandwidth, traffic shaping, and the like, can also be affected by a service profile. The service profile can be influenced by user and remote device profile information, or service provider information. For example, a user may be willing to pay a premium for improved levels of service through adjustment of the service profile, selected remote devices or remote devices associated with selected service providers can be automatically given improved levels of service through adjustment of the service profile, or a combination of such factors can influence adjustment of the service profile. In some embodiments, service levels as specified by a service profile can also be dependent on other factors, such as remote device, remote device type, location, application, and/or the like.

As another example, a service profile influencing access to predetermined functions or applications can be determined according to marketing and sales strategies. For example, access can be linked to a purchase at a hotspot providing network access services. Such an offering could be free access to one or more applications when a coffee is purchased using a stored-value card. As another example, a frequent user at a hotspot could be given a preferred pricing rate, extended time allowances or enhanced access to applications based on previous history of purchases at the hotspot or selected affiliates. Influencing service profiles, for example by a service provider or hotspot location, can be performed on a permanent or trial basis, for example for market or technical research purposes.

It will be appreciated that various service packages providing access to one or more VBAs may be contemplated in the present context without departing from the general scope and nature of the present disclosure, as can various examples, types and configurations of VBAs be combined or provided exclusively in the context of a predefined or custom service package. Furthermore, as will be described in greater detail below, various upsell mechanisms and opportunities may be provided within the present context to provide a user access to additional services, either as a supplement to an existing subscription package, a one-time trial or limited subscription, or the like, for example. Service profiles, service provider partnerships, and the like can be combined to offer access to services such as communication resources, internet, email or social applications, based on one or more factors such as location, time of day, remote device type, remote device service provider, hotspot service provider, and the like.

With reference to FIG. 1, the system 10 may be implemented over various different types and combinations of networks 104 providing for the communicative interfacing of a given remote device 102, network access module 106 and service access module 112. For example, network 104 may comprise a combination of networks conducive to provide a user access to a diversity of services 114. For example, network access may be provided to Sling Media™, which allows a user to connect to their home Slingbox™ device from a remote location; Sony™ Location Free TV, which allows a user to connect to their home Location-Free TV (LFTV) from a remote location; and/or Orb Networks™, which allows a user to connect to their home Orb™ server and retrieve content from their home server from a remote location. Access to other Internet, Web-enabled and/or network services may also be contemplated, including, but not limited to email and messaging services, media access services, gaming services, business collaboration software, social applications, and the like.

In one embodiment, the system 10 comprises a single-cell hotspot wireless network, generally comprising a local area network (LAN) or the like limited to a relatively small spatial area such as a room, a single building, a ship, or an aircraft, otherwise commonly referred to as a single location network.

In another embodiment, the system 10 comprises a wide area network, such as, but not limited to a muni-Wi-Fi network or the like, and is implemented using one or more of a variety of technologies such as a strand-mounted network, a mesh network, and the like. A wide area network could comprise, for example, a metropolitan area network (MAN) that connects two or more LANs together but typically does not extend beyond the boundaries of the immediate town, city, or metropolitan area. Multiple routers, switches, and/or hubs can be connected to create a MAN usable in the present context.

In another embodiment, the system 10 comprises a wide area network (WAN), such as, but not limited to a WiMAX Network or the like. A WAN could comprise, for example, a data communications network that covers a relatively broad geographic area using transmission facilities provided by common carriers, such as telephone companies, interne companies, and other such communication service providers.

It will be understood by the person skilled in the art that various other types and combinations of networks, either currently implemented or developed in the future to facilitate communications over diverse geographical areas, may be considered herein without departing from the general scope and nature of the present disclosure.

With reference to FIG. 1, and in accordance with some embodiments of the invention, a remote device 102, such as a wireless remote device, is a device having the ability to communicate with other devices without having physical contact with them. A remote device can be an electronic device operable as a wireless interface between a user or another electronic device and a network or wireless access point, such as provided at a hotspot or within a wireless network coverage area. A remote device may include, but is not limited to, laptops, Personal Digital Assistants (PDA), Smart phones (e.g. Apple™ iPhone™, HTC S261, RIM Blackberry™ BOLD, etc.), wireless gaming devices such as the Nintendo DS™, the Sony PSP™, the Sony Mylo™, Wi-Fi Cameras, portable entertainment devices (e.g. Apple™ iPod™, iPod™ Touch) and other such devices currently available on the market, in development, or upcoming and based on similar communication platforms and technologies. A remote device may incorporate several functionalities such as those listed above. A remote device can be capable of communicating using one or more different communication modes, such as a combination Wi-Fi and/or cellular device. The person skilled in the art will appreciate that the system 10, as disclosed herein, is readily adaptable to new and upcoming devices, and as such, is considered to include such devices within the context of the present disclosure.

Figure 2A:
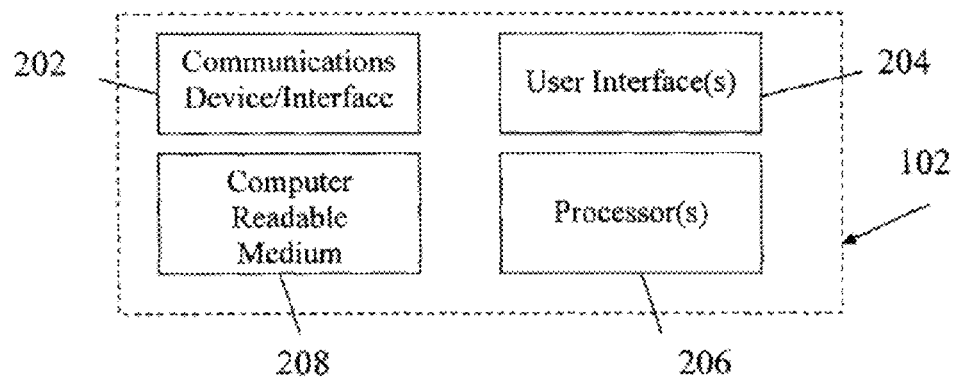
FIG. 2A is a high level diagrammatic representation of an exemplary remote device, in accordance with embodiments of the invention.

With reference to FIG. 2A, and in accordance with some embodiments of the invention, a remote device 102 is depicted. In this embodiment, the remote device 102 generally comprises a computer-readable medium or media 208 for storing statements and instructions for the operation of the remote device, and optionally for storing various forms of data useful in the implementation of remote device functions and/or accessible to the user of the remote device as needed; a communication means such as a communication device and/or interface 202 for interfacing with the network access module 106 and optionally, for direct communication with other similarly configured remote devices; one or more processors 206 for processing received and sent information and for implementing statements and instructions stored on the one or more computer-readable media 208; and a user interface (UI) 204, such as a graphical user interface (GUI), keyboard, keypad, game pad, mouse, scroll ball, touch screens, motion sensing user interface, speech recognition system, or the like for receiving input from the user directed to the operation of the remote device 102. Other remote device elements and/or components, as would be readily apparent to the person skilled in the art, may also be considered herein without departing from the general scope and nature of the present disclosure. For instance, various hardware, firmware and/or software may be integrated or operationally associated with a given remote device 102 to achieve various functions and interface with the user and/or various services accessed thereby over the network 104. Also, various peripheral devices, such as supplemental user interfaces, data input and/or output means (e.g. printers, scanners, removable storage media, etc.), and the like may also be considered herein.

In one embodiment, the remote devices 102 may include browser-based remote devices, wherein such remote devices comprise a browser-based user interface 204, such as a Web browser or the like. Examples of browser-based remote devices may include, but are not limited to laptops, PDAs, and the like.

In another embodiment, the remote devices 102 may include browser-challenged remote devices, wherein such remote devices comprise a browser-challenged user interface 204, such as for example, a microbrowser or the like, and/or comprise a substandard keypad (i.e. non-QWERTY keypad). In one example, a microbrowser is defined as a Web browser specially designed for a hand-held remote device and embedded within the software and/or firmware of this remote device. In this example, the microbrowser is generally optimized so as to display Internet content most effectively for small screens on portable remote devices and have small file sizes to accommodate the low memory capacity and low-bandwidth of such handheld remote devices. Examples of browser-challenged remote devices may include, but are not limited to, a Sony™ PSP™ a Smartphone (e.g. Apple™ iPhone™, HTC S261, etc.), a Blackberry™, and the like. Content providers may, in some instances, be configured to provide pre-formatted content specifically for some or all browser challenged remote devices.

In another embodiment, the remote devices 102 may include browserless remote devices, wherein such remote devices comprise a browserless user interface 204, for instance comprising a display and the ability to accept user inputs (e.g. keypad(s), scroll ball(s), etc.) but not encompassing the functionality common to browsers and microbrowsers. Examples of browserless remote devices may include, but are not limited to, a Nintendo DS™, a Wi-Fi camera, and the like.

The person of ordinary skill in the art will appreciate that other browser-based, browser-challenged and browserless remote devices may be considered herein without departing from the general scope and nature of the present disclosure. This person will further appreciate that, although the above examples have been described with reference to three distinct categories, other categories may also be contemplated based on each remote device's functionality, operability and user interface characteristics. Furthermore, it will be understood that certain remote devices may be best described as falling between any of the above categories, and that such remote devices are considered within the context of the disclosed system 10.

Figure 2B:
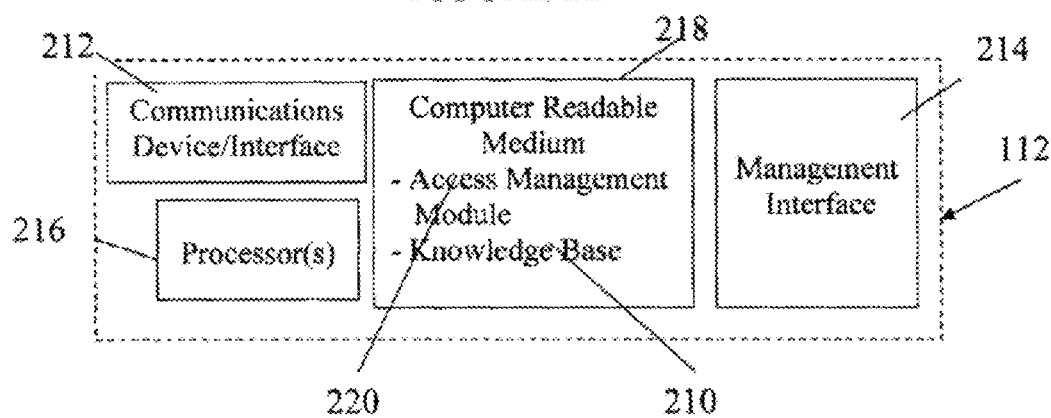
FIG. 2B is a high level diagrammatic representation of a service access module, in accordance with embodiments of the invention.
Figure 2C:
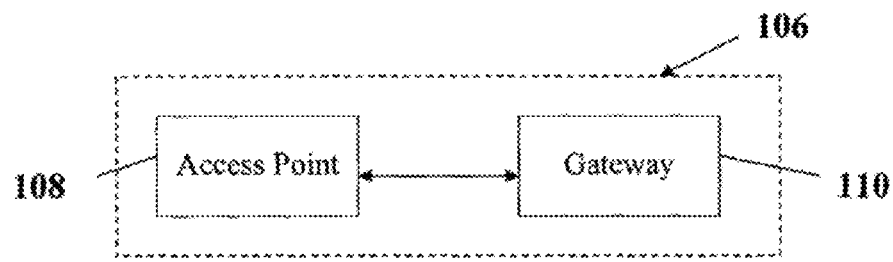
FIG. 2C is a high level diagrammatic representation of a network access module, in accordance with embodiments of the invention.

With reference to FIGS. 1 and 2C, and in accordance with some embodiments of the invention, the network access module 106 of the system 10 comprises a wireless access point (WAP) 108 and a gateway 110. In this embodiment, the WAP 108 comprises a device configured to connect different wireless communication devices together to form a wireless network, and further connect to one or more wired or wireless networks (e.g. network 104), namely via gateway 110, to relay data between remote device(s) 102 and downstream wired and/or wireless devices.

In one embodiment of the invention, the WAP 108 reacts substantially immediately when a remote device 102 scans for an available network. The WAP 108 reacts to the remote device scan by communicating to the remote device 102 that there is an available network connection through the network access module 106.

The gateway 110 can be used to communicate between a remote network and another network, which, in the present context, may provide access to the service access module 112. In this embodiment, the gateway 110 comprises a device configured to communicate between two or more networks which may, for example, use different network protocols (e.g. wireless network protocols, wired network protocols, etc.). Examples of gateways 110 operable within the context of system 10 may include, but are not limited to, Colubris Controllers (e.g. MSC-3200), Cisco™ WLAN Controllers (e.g. Cisco™ 2000, 4100 WLAN Access Controller), and Mikrotik™ RouterOS, to name a few.

In one embodiment of the invention in which a browser-based or browser challenged remote device is being used to access a network, the gateway 110 may intercept the request to access the network 104 and redirect the request back to the remote device 102 through a web browser for the user to input user information. The information requested can be for example, but not limited to, a username and password. The user information can be associated with a user profile for identification, authentication and authorization. Specific remote device information may also be extracted by the Service Access Module 112 (described below) from data communicated through the gateway 110 for the purposes of identifying and/or authenticating the remote device being used to access the network. Such remote device information may include, but is not limited to, the Media Access Control (MAC) address of the remote device 102, traffic type (e.g. communication port, data type, communication protocol, traffic headers, etc.), browser type (e.g. full browser, micro-browser, browser origin and/or configuration, etc.), and/or some other unique identifier (e.g. remote device configuration, serial number, signature related to a remote device clock or crystal oscillator, etc.). This and related remote device information can be associated with a remote device profile for identification, authentication and authorization. The gateway 110 receives the user and/or remote device information through the access point 108 and communicates the identifying information to the service access module 112 for authentication and authorization. Once authorized, network access is implemented, either as wide open access, or as restricted access based on a number of access authorization criteria, which may depend on the remote device type, the remote device configuration, the specific remote device, the specific user, and/or other criteria, or combinations thereof.

In one embodiment, the remote device profile and the user profile can be configured to indicate that network access is to be implemented without further interaction from the user, such as entering a user name and password. Authorization substantially without user interaction, for example based on user profile information and remote device profile information which is automatically transmitted by the remote device, is referred to herein as Express Authentication. In one embodiment, Express Authentication can further include expedited user interaction, for example, by requiring only a "one-click" or "one-action" connection confirmation from the user or requiring only a password or other convenient user data, such as biometric data, to connect.

In some embodiments, information used for authentication can include user provided information, remote device or remote device type information, and/or other information such as one or more of: user credit card information, prepaid service card information or PIN, user or remote device subscription information, access information or access history, prepaid or stored value card or smart card information for a hotspot or associated product or service provider, PIN distributed for promotional purposes, location information, usage time, date or time of day information, or other information as would be understood by a worker skilled in the art.

In some embodiments, authentication can be performed using information readily accessible. Additionally, if the information initially available for authentication is insufficient for making an authentication decision with a predetermined level of certainty, additional information can be obtained. For example, authentication can be initially based on device information transmitted during an initial connection request, with an option to request a user name and/or password if said transmitted device information cannot be used to uniquely identify the remote device. As another example, information resulting from a transaction related to the remote device can be used to support authentication. For example, if a user pays for a service or associated product or service with a prepaid or stored value card such as a smart card at the hot spot, information resulting from the transaction can be used to support authentication. This may require correlating said transaction with the remote device, for example by entering a PIN on the remote device that is printed on the transaction receipt. As another example, contextual information such as time of day or location information can be used to support authentication. For example, usage time and location patterns of a remote device can be tracked, and if a remote device requests an atypical service or requests service in an atypical location, time of day information may be used to determine whether it is more likely that the user's information or remote device has been stolen or whether the user or remote device is associated with an atypical purpose for that user (such as vacation or leisure time instead of work time).

In some embodiments, user and remote device profiles are managed, for example by a security management module and/or access management module, to reduce or deal with potential fraud, remote device theft, password theft, or other misuse, and to improve user experience and access control. For example, information or suspicious activity can be logged, tracked and reported to assist in managing fraud, theft or other misuse. Security management can include automated or semi-automated management, or management by one or more service providers on behalf of the service providers themselves, other service providers, or users. Management can include applications or services enabling tracking and analysis of remote device or user activity, management of services, service contracts, manual or automated payment options, and the like.

In some embodiments, security is managed by one or more of requiring users to provide username and/or password information; restricting access parameters such as session time limits, concurrent usage by the same user, geographic location, and/or the like; and other methods such as Express Authentication, Advanced Device Profiling, multi-factor authentication, authentication using an SMS messaging system, and fraud detection, or other methods as would be understood by a worker skilled in the art.

In some embodiments of the invention in which a browserless remote device is used to access a network, the gateway 110 detects the remote device request for network access and forwards it to the service access module 112 (described below) where remote device information may be extracted from remote device communications, as described above. In general, the gateway 110 receives the user and remote device information through the access point 108 and communicates this information to the service access module 112 for authentication and authorization. Once authorized, network access is implemented, either as wide open access, or as restricted access based on a number of access authorization criteria. Said network access can be implemented based on the application of authentication constraints. In addition, depending on remote device and/or user registration settings, an optional request for user information and/or confirmation may be communicated to a distinct remote device of the registered user for confirmation. For example, a confirmation message could be sent to a user's cellular phone, or other such device, via a Short Message Service (SMS), wherein the user may then confirm via this distinct device that they are in fact attempting to access the system via their browserless remote device. In this scenario, this would allow a user to identify an event where access to the system is being erroneously and/or fraudulently attempted using their remote device and/or remote device identity. It is contemplated that other multi-factor or strong authentication systems can be implemented in conjunction with some embodiments. For example RSA™ SecurID™, Phonefactor™ or similar services can be implemented during authentication. For example, location of a customer's cellular phone may be determined by cell tower association or GPS to determine the likelihood that the customer is indeed at the location where authentication is being requested. In addition, if authentication fails, the system can be configured to give the appearance that authentication has succeeded for the purposes of tracking or apprehending potentially fraudulent use.

In one embodiment, the gateway 110 may be configured to forward remote device communications to the service access module 112 where identifying data may be extracted from remote device transmissions only, wherein such identifying data may comprise remote device type information, specific remote device information, remote device configuration information and the like. Using remote device identification data only to connect can be described as a form of Express Authentication. Using remote device identification data only enables the system 10 to authorize different remote devices access to wide open services or a selection thereof based only on remote device data, and not on inputted user data. This feature may be particularly useful in an example wherein a browserless remote device seeks access to the network but wherein such browserless remote device does not include functionality of a conventional type-in user interface allowing for the input of a username and password, for example. This feature is also applicable to browser-enabled or browser-challenged remote devices, to provide more user-friendly and faster connection to network applications. In another embodiment, Express Authentication can also include automatically transmitted user information, either automatically requested of and provided by the user during authentication or stored on the remote device, or a combination thereof. For example, user information can include information stored on a cookie, or input by the user via interface with the remote device.

It will be appreciated by a person skilled in the art that the functions implemented by the network access module may be provided by a combination of a WAP 108 and gateway 110, or applied using other device architectures, known or developed, to provide such functionality. Furthermore, though the above examples contemplate forwarding remote device communications to the service access module 112 for identifying data extraction, it will be appreciated that the network access module may also be configured and adapted to extract such information from remote device communications and forward this information to the service access module, or to other modules of the system for manipulation, without departing from the general scope and nature of the present disclosure.

Service Access Module

With reference to FIGS. 1 and 2B, and in accordance with some embodiments of the invention, the system 10 comprises one or more service access module(s) 112 configured to communicate with the network access module(s) 106 to operatively identify, authenticate and authorize one or more remote devices 102 access to one or more services 114.

In the example illustrated in FIG. 2B, the service access module 112 generally comprises a computer-readable medium or media 218 for storing statements and instructions for the operation of the module 112, and for storing various forms of data useful in the implementation of module functions and management of the service access module 112; a communication means such as a communication device and/or interface 212 for interfacing with the network access module 106 through the network 104 and optionally, for direct communication with providers of the one or more services 114; one or more processors 216 for processing received and sent information and for implementing statements and instructions stored on the one or more computer-readable media 218; and an optional management interface 214, such as a graphical user interface (GUI), keyboard, keypad, mouse, scroll ball or the like for receiving input from a system manager directed to the management of the service access module 112.

It will be appreciated that other service access module elements and/or components, as would be readily apparent to the person skilled in the art, may also be considered herein without departing from the general scope and nature of the present disclosure. For instance, various hardware, firmware and/or software may be integrated or operationally associated with the service access module 112 to achieve various functions and interface with the remote device(s) 102, the network access module 106 and/or various services 114 accessed thereby over the network 104. Also, various peripheral devices, such as supplemental user interfaces, data input and/or output means (e.g. printers, scanners, removable storage media, etc.), and the like may also be considered herein. It will be further appreciated that the service access module 112 may be implemented centrally, in a distributed architecture, or in a combination thereof to achieve a desired functionality and level of complexity.

In the embodiment depicted in FIG. 2B, the computer readable medium 218 of the service access module 112 comprises an access management module 220 and a knowledge base 210, wherein the latter can be defined as a structured collection of records or data that is stored on the computer readable media 218. As will be described below, when a user attempts to register for an account, the network access module 106 (e.g. the gateway 110 of FIG. 2C) accesses information from the user and/or the user's remote device 102 and sends it over network 104, where it can be stored by the service access module 112, for example in a knowledge base 210. Information retrieved and stored may include such information as, but not limited to, user name, user password, account number, number of remote devices, remote device types, MAC Addresses, browser information, remote device configuration, service packages and/or user, remote device and service profiles, and the like. The database may also contain information regarding the hotspot access point (e.g. the specific network access module 106 implemented), for example, but not limited to, the hotspot access configuration and location information.

In some embodiments of the invention, remote device information such as remote device types, MAC Addresses, browser information, remote device configuration, clock or crystal oscillator information, serial numbers, and the like, is used to create an Advanced Device Profile (ADP) for authentication purposes. The ADP can be used to identify, track, manage, and report on remote devices by remote device type, remote device model, or specific instance of a remote device. In some embodiments, for registered remote device, remote device type, or remote device class, a copy of the advanced remote device profile can be stored for access by the service access module, for comparison with characteristics of remote devices attempting to connect to services through the network access module for identification, authentication and authorization purposes. User or remote device access can be configured based on the ADP to allow access to be tailored toward the remote device, or to package access privileges with ownership of selected remote devices or subscription to selected service providers, for example. The ADP can also be used to enable Express Authentication, wherein user and/or remote device authentication can proceed with reduced or no input from the user.

In some embodiments, remote device information, for example as can be used to create or verify against an ADP, is captured during negotiation of a connection between the remote device and the network access module. For example, in one embodiment, a remote device may send a request to initiate a wireless connection with the network access module through an application such as a web browser. Depending on the remote device or remote device type, the request can contain different information, or be configured in different ways as would be understood by a worker skilled in the art. For example, a connection request can include specifically configured fields in HTTP headers, configurations of portions of a query string in a URL, MAC address, or other configurable aspects of the connection request as would be understood by a worker skilled in the art. This configuration information can be indicative of the remote device or remote device type, since connection requests by different remote devices or device types can be configured differently. For example, different types of connections can be requested in different ways by different remote devices such as laptops, PDAs, gaming devices, or the like. The information related to the connection request can be forwarded by the network access module to the service access module, the service access module configured to extract and analyze the information to obtain further information about the remote device or remote device type, for example by comparing the configuration of connection request information against one or more ADPs which relate predetermined profiles or configurations of information to one or more remote devices or remote device types typically having said profile. The further information obtained from this analysis can subsequently be used for authorization or authentication purposes.

Furthermore, as an alternative to or in addition to configuration information obtained during the initial request as described above, information about the remote device can be obtained by running a script or query on the remote device. For example, in response to a connection request by the remote device, the service access module can transmit a script to the remote device (via the network access module), or remotely trigger execution of a script already on the remote device. The script can be configured to extract and communicate identifying data to the service access module (again via the network access module). For example, a script could obtain and transmit configuration information about the web browser application, application version, host operating system, host hardware platform, language, screen size, and the like. This configuration information can be stored and accessed in ways known to a worker skilled in the art and can be indicative of the remote device or remote device type, since different remote devices can be configured differently. For example, different remote devices such as laptops, PDAs, gaming devices, or the like are typically configured differently with different hardware and software. In addition, some configuration information may not exist on some remote devices, resulting in an error when such configuration information is searched for. These errors can also be indicative of the remote device or remote device type, since it can be used to explicitly eliminate possible remote device configurations which would not typically have resulted in such errors. The information obtained and communicated by the query or script can be analyzed by the service access module to obtain information about the remote device or remote device type, optionally in conjunction with other information, for example by comparing the information against one or more ADPs which relate predetermined profiles or configurations of information to one or more remote devices or remote device types typically having said profile. The information obtained from this analysis can subsequently be used for authorization or authentication purposes.

Figure 12:
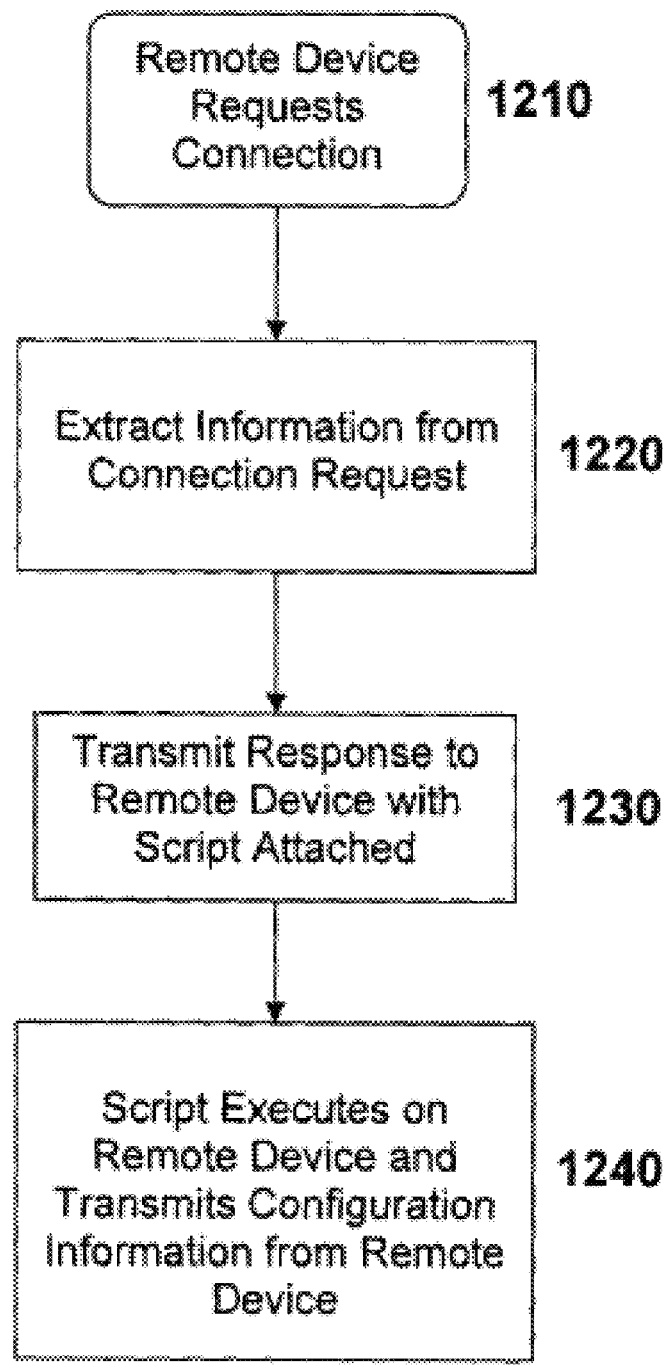
FIG. 12 is a flow diagram depicting an exemplary method for extracting information from a remote device, according to an embodiment of the invention.

FIG. 12 illustrates an example of extracting information from a remote device according to an embodiment of the invention. In step 1210, a network connection is requested, for example in response to a user opening a browser on the remote device. The system can respond, in step 1220, by forwarding the connection request from the network access module to the service access module, where information related to the connection request can be extracted as described above. The network access module and service access module can also respond concurrently in other ways, for example by redirecting a browser to an intercept page, and executing processes related to said intercept page to obtain user information. In step 1230, a response to the network connection request is sent from the service access module to the remote device via the network access module. A script, such as a javascript or mobile software agent, or trigger for a script existing on the remote device, is sent with the response. In step 1240, the script executes on the remote device to extract information about the remote device as described above. Information obtained by the script is transmitted back to the service access module via the network access module. Information extracted from the connection request and information transmitted by the script can then be used for authentication or authorization, for example by comparing said information to one or more ADPs to identify the remote device or remote device type, and to authenticate or authorize said remote device or remote device type accordingly.

In one embodiment, Express Authentication can be implemented, wherein user input is substantially reduced or eliminated during the identification, authentication and authorization process. In one embodiment, Express Authentication includes automatic profiling and authentication and certification of remote devices, for example by uniquely identifying a remote device based on matching selected remote device information to information stored in a knowledge base, the information being associated with a unique remote device described in the knowledge base, or by detecting mismatches between selected remote device information and information stored in a knowledge base, in order to deny authentication of a remote device. For example, if substantially all of the remote device information reported by a remote device matches a predetermined selection of remote device information stored in a remote device profile stored in the knowledge base and associated with a valid or authorized user profile stored thereon, Express Authentication can be allowed. As another example, if one or more predetermined portions of the remote device information reported by a remote device do not match corresponding remote device information stored in a remote device profile stored in the knowledge base and associated with an authorized user profile, Express Authentication can be denied.

In some embodiments of the invention, the number and type of attributes of remote device information checked against the database can vary randomly or deterministically, and in conjunction with previous history of authentication attempts, to provide efficient and convenient service while maintaining security and integrity of the authentication and authorization procedures. For example, additional authentication challenges, including multi-factor authentication challenges, can be issued or more detailed remote device information attribute analysis can be performed at random, with probability escalating with the perceived risk of fraudulent or unauthorized remote device usage. In some embodiments, Express Authentication can be satisfied by the same user or remote device in different manners, potentially resulting in different access to services.

In some embodiments of the invention, the knowledge base 210 is a relational database. A relational database refers to a type of database wherein a table stored in the database comprises rows and columns that are populated with information retrieved from the network access module 106 (e.g. access point 108 and gateway 110). In a relational database, there are one or more tables containing stored information, which may be interrelated through one or more qualified connecting values so that information can be shared between tables.

Figure 11:
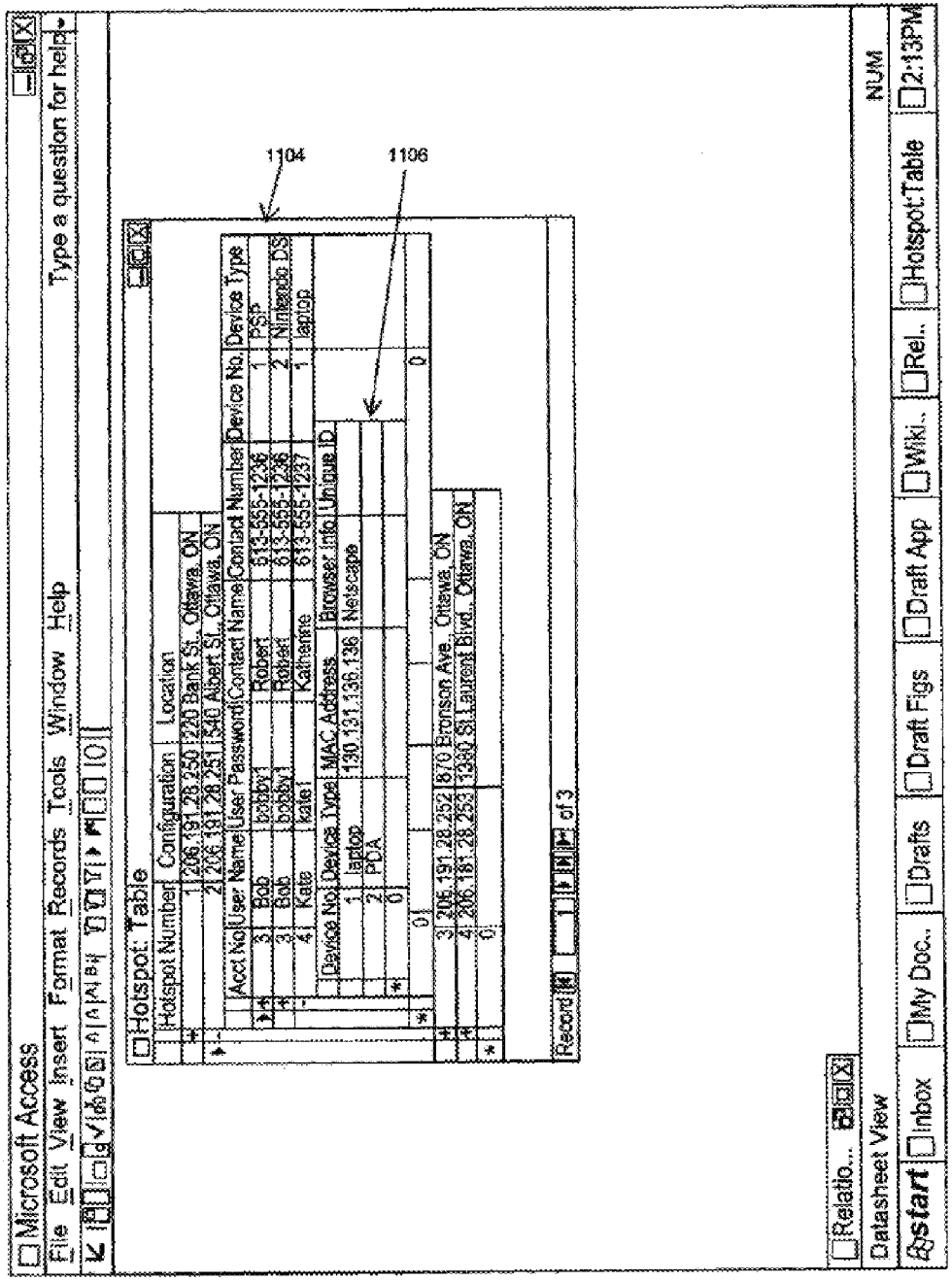
FIG. 11 is an exemplary screen shot depicting a relational database containing sample data of hotspot access networks, user profiles, and device profiles, in accordance with embodiments of the invention.

FIG. 11 provides an exemplary screen shot of such a database, namely a Microsoft Access™ database comprising sample hotspot, account, and remote device information stored in separate tables with a relationship connection to the other tables in the database. This illustration is meant to provide an example of sample information that could be stored in a database in the context of the present disclosure, wherein various types of information could be retrieved and stored. It will be apparent to the person of skill in the art that other types of database systems and structures, such as Microsoft SQL Servers or the like, could be considered herein without departing from the general scope and nature of the present disclosure.

In some embodiments, remote device information is stored in the knowledge base 210 in the form of a remote device profile, generally comprising an account variable that refers to characteristics of a remote device that allows for recognition and identification of a specific remote device, which may include, but is not limited to, known requirements of that remote device for connecting to the Internet, for example. In one or more embodiments, remote device information is collected when a user attempts to access the network via a given network access module 106, or when a user registers for a remote device account, as described below, and is stored in the knowledge base 210 for use in the authentication of the user and/or remote device when accessing the system 10. FIG. 11 provides an example of a remote device profile 1106, in accordance with an illustrative embodiment of the invention.

In some embodiments, user information is stored in the knowledge base 210 in the form of a user profile, generally comprising an account variable that refers to information about the user retrieved from the user, including for example, but not limited to, the user's name, a created username and password, contact information, user type, preferred payment method and/or means, and the like. In one embodiment, user information is collected when a user attempts to access the network via a given network access module 106, or when a user registers for an account, as described below, and is stored in a database for use in the authentication of the user and/or remote device when accessing the system 10. FIG. 11 provides an example of a user profile 1104, in accordance with an illustrative embodiment of the invention.

In some embodiments, a service profile is stored in the knowledge base 210, generally comprising an account variable created by a combination of one or more of a remote device profile, a user profile, an account type, and associated devices. In one example, service profiles are generally defined as subscription packages that enable subscribed users access to certain network-based functions and services, such as, but not limited to, Live TV™ from a home location or online gaming packages, as further elaborated and described above. During a registration process, defined in greater detail below, a user may be given options of services available for each type of remote device functionality. The service options can be used to limit a user's access to the Internet and/or other networks once the user chooses an option, or to expressly define, disable or enable certain access parameters, for example in accordance with aspects of relevant service profiles. Consequently, the user can then pay a predetermined price for the services selected, or have access to predetermined capabilities for free in conjunction with predetermined purchases. In one embodiment, a user can choose different packages for different registered remote devices, or may select one package that allows access to all the networks with any remote device registered.

In some embodiments, a service profile is associated with a group of authorization constraints, authorization whitelist attributes, or a combination thereof. The authorization constraints can specifically deny or block predetermined services or aspects thereof, while authorization whitelist attributes can specifically allow or enable predetermined services or aspects thereof.

In some embodiments, access to selected functions and services may be extended to all users of a given remote device type, or to all users of a given group or adhering to a same promotional package or the like, without registration and/or subscription by the user. For example, all users or remote devices falling within a given category could be entitled to access one or more selected functions and/or services attributed to this category without prior subscription or registration by these users.

In one example, a service profile is defined for a user of a laptop, a Sony PSP™, and a Windows Mobile™ PDA, who also occasionally uses a second laptop, e.g. borrowed from the user's work or elsewhere. The user of the present example could also have a Location Free TV (LFTV) at home, as well as Orb™ on a desktop system. Accordingly, the user would be able to use any of these remote devices on a supported network although there may be restrictions on concurrent usage, for example, wherein only one of each type of remote device can be connected at any time per account. By registering all the above remote devices and selecting an appropriate service package, the user can be able to access LFTV on his laptop and PSP™, or using the Orb™ device, access files from the user's home computer on his laptop, etc. while at a hotspot access location.

Furthermore, in some embodiments, an upsell feature may also be provided such that a user of a given remote device is provided the option to upgrade their current service package to include additional and/or upgraded services. For example, various upsell mechanisms and opportunities may be provided within the present context to provide a user access to additional services, either as a supplement to an existing subscription package, as a one-time trial or limited subscription, and the like. Such upsell mechanisms may be configured to market new or supplemental services at various instances during use, for example upon access to the system, periodically during use, etc., or again provide such opportunity in response to specific user actions.

For instance, in some embodiments, when a user of a given remote device having restrictive access to the system attempts to access a resource not currently permitted by the user's current service profile, for example as defined by a service profile applied to the user or the user's remote device, this traffic may be redirected to an interactive interface providing the user the option of upgrading or enhancing their service profile, for example, for an additional fee. For example, when a user or remote device registered only for gaming services attempts to surf the Web, an intercept page may be accessed instead proving the user of this remote device the option to upgrade their service profile to enable access to Web surfing functions. Other such examples should be apparent to the person skilled in the art and are thus not meant to depart from the general scope and nature of the present disclosure.

In some embodiments of the invention, the service access module includes a Service Authentication and Authorization Manager (SAAM), which can be configured to securely provision and manage users and remote devices on networks such as Wi-Fi networks. The SAAM can be configured to authenticate and authorize users, remote devices, or combinations thereof, based on user profiles, remote device profiles, and service profiles stored in a knowledge base accessible to the SAAM. The SAAM can further be configured to authenticate and authorize users, remote devices, or combinations thereof based on service provider information, such as promotional use information, location information, time information, or other information as would be understood by a worker skilled in the art.

As an example, authentication can be based on information obtained through use of a stored value card for product or service purchases, by associating user information related to the stored value card with user profile information for authentication. For example, user information related to the stored value card can be acquired from a third party managing the stored value card. User information related to the stored value card can include cash balance information and information on history of card use, such as date and location of previous uses.

In some embodiments, the SAAM can be configured to enable Express Authentication, wherein user input is substantially reduced or eliminated during the identification, authentication and authorization process. For example, Express Authentication can enable instant or one-click secure authentication based on stored and automatically transmitted user and remote device profile data. In this embodiment, the SAAM can be configured to collect, authorize, and authenticate a user and/or remote device based on the automatically transmitted data.

In some embodiments, the SAAM is configured to collect identification data, for example automatically transmitted user and remote device profile data, without requiring a client application to be installed or configured on the remote device being identified, authenticated, and authorized. In one embodiment, instead of requiring a specialized application operating on the remote device, identification data can be collected on the basis of availability. For example, hardware information, system settings, and information embedded in applications such as Windows™ Update, iTunes™, the YouTube™ application for iPod™, or other applications residing on the remote device can all be sources of remote device information for providing to the SAAM or other authentication or authorization module. As another example, information can be extracted from standard communications with the remote device, or requested through a web browser, SMS service or other native application, or supplied using a second device carried by the user.

In some embodiments, remote device and/or user information is not automatically transmitted from the remote device, but is transmitted in response to a request or query. For example, a program, software agent, or mobile software agent such as a Java aglet can be transmitted to and/or initiated on the remote device during identification, which, during execution, gathers and transmits user and/or remote device information to the network access module, service access module, or SAAM. For example, a javascript application can be used to gather and transmit remote device information in this manner.

Service profile parameters can be dependent on other factors such as date, time of day, remote device type or remote device class, location, hotspot or business operators or venues, service profiles, simultaneous usage of remote devices by a user, session idle time or timeouts, time from expiration of prepaid or introductory service, customer loyalty, payment history, and other factors that would be understood by a worker skilled in the art. For example, frequent or preferred customers, or customers who are the focus of a marketing campaign or promotional partnership agreement, may be given temporarily enhanced service for business purposes. For example, a service profile may be created or updated to include additional services for promotional purposes for remote devices associated with particular service providers, when users of the remote device purchase a product (such as a coffee) in particular hotspot locations. The service profile may indicate for example that selected services can only be used on the day of purchase at the particular hotspot location where the purchase was made, and then only until expiry of a predetermined time period.

It will be apparent that a variety of service packages and upsell mechanisms and strategies may be considered herein without departing from the general scope and nature of the present disclosure. As any user may use anywhere from one to plural remote devices, and that, of one or more different types of remote devices, the combinations of services, remote device type service access requirements and adaptable service restrictions for each or all combination of remote devices can be implemented using the disclosed system 10 and operational embodiments thereof.

Access to the features and services considered for in the implementation of the system 10 is generally provided via the identification, authentication and authorization of a user and/or remote device based on identifying data accessed by the service access module 112 via network access module 106.

In general, a user may access the system 10 once the user, or a remote device used thereby, is registered to access the system. In one embodiment, a user may register themselves, or one or more remote devices that they intend to use with the system 10, via a pre-registration process implemented online, in person, over the phone, or in another manner wherein information relating to the user and/or one or more remote devices are provided to a system administrator enabling registration of such identifying information for future use in an authentication and authorization process. In some embodiments, registration may be performed upon first access, or attempted access to the system 10 by a user, or by a remote device thereof. Other registration strategies, or combinations of pre-registrations, registration confirmations, direct registrations and/or updated (e.g. service upgrade or downgrade) registrations should be apparent to the person skilled in the art and as such, are not considered to depart from the general scope and nature of the present disclosure.

In some embodiments of the invention in which a browser-based or browser challenged remote device is being used to access a network, the network access module 106, or gateway 110 thereof in the embodiment of FIG. 2C, may intercept the request to access the network 104 and redirect the request back to the remote device 102 through a web browser for the user to input user information. The information requested can be for example, but not limited to, a username and password. The gateway 110 may also forward the request and subsequent communications, if any, to the service access module 112, where specific remote device information may be extracted from such communications for the purposes of identifying the remote device being used to access the network 104. Such remote device information, for example forming part of the remote device profile, may include, but is not limited to, the Media Access Control (MAC) address of the remote device 102, traffic type (e.g. communication port, data type, communication protocol, traffic headers, etc.), browser type (e.g. full browser, microbrowser, browser origin and/or configuration, etc.), and/or some other unique identifier (e.g. remote device configuration, serial number, signature related to a remote device clock or crystal oscillator, etc.). The gateway 110 forwards the user and/or remote device identifying information (user profile, remote device profile) from the access point 108 to the service access module 112, for example, from where it can be authenticated, for example via a Remote Authentication Dial In User Service (RADIUS) protocol or other public and/or proprietary protocols, to determine whether the user and remote device 102 are registered to access the network.

In some embodiments of the invention in which a browserless remote device is used to access a network, the gateway 110 detects the remote device request for network access, requests user information to be input via a Short Message Service (SMS), and optionally forwards the request and/or subsequent communications, if any, to the service access module 112 where specific remote device information may be extracted from such communications for the purposes of identifying the remote device being used to access the network 104. Identifying information is then used by the service access module 112 for authentication to determine whether the user and remote device 102 are registered to access the network.

In some embodiments of the invention in which a browser-based, browser-challenged or browserless remote device is used to access the network, the gateway 110 detects the remote device request for network access and forwards the request and/or subsequent communications, if any, to the service access module 112 where specific remote device information may be extracted from such communications for the purposes of identifying the remote device being used to access the network 104. The identifying information is then used by the service access module 112 for authentication to determine whether the remote device 102 is registered to access the network.

It will be appreciated that remote device identifying data may be extracted by one or more components of the system 10, namely the network access module 106, the service access module 112, and/or any component thereof, with proper software, firmware and/or hardware configurations, without departing from the general scope and nature of the present disclosure.

In one embodiment of the invention, registration to access the system 10 comprise two components: user registration and remote device registration. User registration can occur during the same session as the remote device registration, user registration can occur independently of remote device registration, either outside the hotspot network through a registration website, or while accessing the hotspot network.

In one embodiment, registration of a user can result in creation of a user profile stored in a knowledge base, whereas registration of a remote device can result in creation of a remote device profile stored in a knowledge base. Registration of either a user or a remote device can also result in creation of a service profile stored in a knowledge base. User, remote device and service profiles within the knowledge base are preferably linked for retrieval and association of information contained therein.

With reference to FIG. 3, and in accordance with some embodiments of the invention, when a user registers outside the hotspot network as determined at step 302, registration occurs through a web browser interface. A user enters the website to register for an account. As the user enters the website, information about the remote device being used is stored at step 322. The website is programmed to reformat the page depending on the type of remote device used and the type of browser available at step 323. For example, but not as a limitation to the type of remote device that can be used, a laptop can use a full browser, whereas a PSP uses a microbrowser. The user selects whether to login or create a new account at step 324, depending on whether the user has previously set up an account. If the user has not previously created an account, the user selects the option to create a new account, and the browser is redirected to the new account homepage at step 330, which displays the service options, prices, and procedures available to the user. The user enters information into a form on the website and the website sends the information to be stored in a database at steps 332 to 342. The user enters contact information and selects the services to which access is desired at steps 332 and 336. The user can register more than one remote device to be used. The user has the option of paying for the services selected, which creates a new paid account in a database, or the user can select to use a free trial, and the payment or free trial option information is stored in the database at steps 338 to 342. Once the account creation is complete, the browser is redirected to the user homepage at step 318, where the user's service summary is displayed, their account verification is requested, and the user can select to register more remote devices, or choose to upgrade their services and select payment options. The user has the option to logout or connect to the network at step 320, however, since the user is not at a hotspot access point, the user generally chooses to logout.

In some embodiments of the invention, when a user registers while accessing the hotspot network, determined at step 302, through a browser-based or browser-challenged remote device 102, the network access module 106, or access point 108 thereof, (FIG. 2C) recognizes that the remote device 102 is scanning for a network connection, the access point 108 redirects all unauthenticated remote devices to an intercept page for authentication. An intercept page is a webpage that receives user login input. While the user attempts to access the network by logging in using the intercept page, the network access module 106, or the gateway 110 thereof (FIG. 2C) stores information from the user and the remote device being used, for example, but not limited to, user name, password, MAC address, browser type, cookie information, etc. at step 304.

In some embodiments of the invention, when a user registers while accessing the hotspot network through a browserless remote device 102, there is provided an SNMP Trap, such as but not limited to the KIWI SNMP Trap, that allows the browserless remote device user to register. The SNMP protocol is used by network management systems to monitor network-attached remote devices for conditions that warrant administrative attention. The gateway 110 detects what type of remote device is being used through key unique attributes of the remote device, for example, MAC address (including manufacturer prefix), host IP address, and other properties that can be obtained remotely through special features in the network access module 106, at step 306. For example, UTStarcom™ smartphones generally include HTTP headers such as "UA-pixels: 240.times 0.320" or "x-wap-profile: http://www.htcmms.com.tw/gen/apache-2.0.xml".

Depending on what type of remote device is detected and/or what type of browser is being used, as explained above, the website will automatically reformat to suit the type of remote device and/or browser being used, at step 308. If the user has already registered for an account, and has registered that particular remote device as well, the system 10 will recognize the user and remote device and proceed to a login session at step 310. If the user has previously programmed his account to automatically login (for example in accordance with portions of Express Authentication), the browser automatically proceeds to the user's home page at step 312, which displays the user's remote device registration, service summary, and account verification 318. The user can choose to connect to the available services or logout of the system at step 320.

If, however, the user has not registered for an account, or has not previously registered that particular remote device, the browser proceeds to the login or register new account option at step 324. If the user has previously registered for an account but has not registered the particular remote device being used, the user chooses to login at step 324, and proceeds to allow the remote device information to be extracted and stored in a database at step 326. The user can choose to save the remote device details to their account, and access the network using that remote device, or the user can choose not to save the remote device, and is sent directly back to the user home page at steps 326 and 328. If the user has not previously created an account, the user is sent to the New Account Home Page, and is required to input contact information, select service options, and select payment options to create an account, at steps 330 to 342, providing the browserless remote device supports such functionality. Otherwise, access is not provided and registration is required via external means, such as described above.

Depending on the service and remote device in use, the user may be required to register themselves and a specific remote device 102 in order to purchase a connection and/or receive full benefit of the service. The difference is based mainly on whether the remote device to be registered is browser-based, browser challenged, or browserless.

Remote device registration is meant to be as comprehensive as possible, and some portion of the registration process may vary from remote device to remote device. The user has the option to edit their profile immediately after logging on to the system through a browser-based or browser challenged remote device, for example, the user may add another remote device to their profile. Browserless remote devices, however, are generally more limited in what applications and information they may be provided access to, based for example, on their user interfacing capabilities.

In some embodiments of the invention, when a user enters a hotspot area with a browser-based or browser-challenged remote device 102, after the user has created a registered account in the system 10, as described above, the access point 108 sends an intercept page requiring the user to input their user name and password, or only their password, or other information that can be used to identify the user. Once the user has input their information into the browser form, the information is sent through the network 104 to be compared with valid user information stored in the service access module 112.

In some embodiments of the invention, when a user enters a hotspot area with a browserless remote device 102, after the user has created a registered account in the system 10, as described above, the access point 108 uses a SNMP Trap to collect the user information and send it through the network 104 to be compared with valid user information stored in the service access module 112. In addition, depending on remote device and/or user registration settings, an optional request for user information and/or confirmation may be communicated to a distinct remote device of the registered user for confirmation. For example, a confirmation message could be sent to a user's cellular phone, or other such device, via a Short Message Service (SMS), wherein the user may then confirm via this distinct device that they are in fact attempting to access the system via their browserless remote device. In this scenario, this would allow a user to identify an event where access to the system is being erroneously and/or fraudulently attempted using their remote device and/or remote device identity.

In some embodiments of the invention, when a user enters a hotspot area with a browser-based, browser-challenged, or browserless remote device 102, after the user has created a registered account in the system 10, as described above, the gateway 110 retrieves specific remote device information from the remote device and sends that information through the network 104 to be compared with valid remote device information stored in the service access module 112.

There are many different remote devices 102 that may be used with the system 10. To accurately identify a remote device there may be a number of different pieces of information needed to be retrieved from the remote device. The MAC address of the remote device is an example of one piece of information that can help identify a remote device, however, it may not be sufficiently robust, as spoofing is possible and quite simple on some platforms with the proper tools. Depending on the security levels expected from implementation of the system 10, using simple remote device identification methods such as using the MAC address may be sufficient.

In an embodiment where one seeks to reduce or avoid MAC address spoofing problems, other pieces of information may be available to help identify a remote device and can be retrieved by the gateway 110 while the remote device is attempting to access the network 104 through the access point 108. For example, some of the information that can be retrieved from a remote device that can help uniquely identify it include, but are not limited to the following: MAC address (including manufacturer prefix), browser characteristics, operating system characteristics, host IP address, traffic headers, clock or crystal oscillator characteristics, serial numbers, and other properties that can be obtained remotely through special features in the network access module 106.

Using identifying data provided by the user, and/or provided automatically by the user's remote device, the service access module 112 proceeds to the authentication of the user and/or remote device. In some embodiments, authentication is intended to be user-centric, for example, a user with a valid account should be able to connect to the network 104 and access those services for which he has subscribed (which may include all services available in a wide open access system), on whichever remote device 102 he happens to be carrying at that moment, or alternatively, for which remote device registration has been implemented. The characteristics of the remote device 102 and/or application attempting to connect to the network 104 can factor into the mechanics of the authentication process, and as such, the system 10 can be configured to address these factors.

In one embodiment of the invention, authentication is intended to be device-centric, for example a remote device which is associated with a valid account should automatically or semi-automatically connect to the network through a hotspot once it becomes available. For example, Express Authentication can be used to connect a registered remote device, possibly including prompting a user to confirm said connection.

In one embodiment, a RADIUS is used as an authentication, authorization, and accounting (AAA) protocol. Such a protocol is commonly known in the art and used for applications such as network access or IP mobility. For access to a network to be granted, the information input into the remote device web browser or retrieved by the SNMP Trap, depending on what remote device is being used, is passed through the network access module 106 (e.g. the access point 108 and gateway 110 of FIG. 2C), to a RADIUS server operatively coupled to or integrated within the context of the service access module 112, over the RADIUS protocol. For example, a Network Operations Center (NOC) authentication request can cause an access-request to the RADIUS database which will return an access-accept or access-reject status. In general, the RADIUS server checks that the information is correct using authentication schemes such as Password Authentication Protocol (PAP), Challenge-Handshake Authentication Protocol (CHAP), or Extensible Authentication Protocol (EAP). If accepted, the server will then authorize access to the ISP system and select an IP address. If the username and password are correct, RADIUS will return the length of time remaining for the account and the name of the access list to use. If the account has time remaining and is not disabled, the remote device is authenticated and the access list is enforced by the access point 108. In one embodiment, the access list is what defines what a remote device can or cannot do while connected to the access point 108. The individual definitions are stored in RADIUS but loaded to the access point daily, for example, the RADIUS server will also be notified if and when the session starts and stops, so that the user can be billed accordingly.

In order to have control and flexibility over authentication and authorization, a RADIUS database may be used by the service access module 112 to provide the same programmatic potential as a proprietary local knowledge base could. The RADIUS database can contain access lists associated to the different service packages provided as described above. These advanced authentication methods allow authentication through means that extend beyond the traditional client or browser-based methods, allowing more remote devices, for example, browser challenged or browserless remote devices to connect and reconnect at public hotspots.

In some embodiments, the advanced authentication methods can allow differentiated authorization based on identification and authentication data, as well as other factors. For example, different users, remote devices, remote device types or remote device classes can be offered different services or different aspects of a service profile can be applied based on information about the remote device, location, time of day, service providers, payment, purchase of related products, service contracts, and other information as would be understood by a worker skilled in the art.

In some embodiments of the invention, the access point 108 is configured to send an 'Association Success' trap to a remote Simple Network Management Protocol (SNMP) client allowing for authentication of remote devices 102 that do not invoke an intercept page, for example, browserless remote devices. SNMP is used by network management systems to monitor network-attached remote devices for conditions that warrant administrative attention. SNMP is used to collect interface information from remote devices 102. A person with ordinary skill in the art would recognize how SNMP traps are used to collect information from remote devices 102 and connected to a network 104 through an access point 108. For example, the remote device interface information can be passed through the gateway 110 to the RADIUS database, as described above, to acquire authentication.

In one embodiment of the invention, the access point 108 is also configured to receive a request, for example, a Hypertext Transfer Protocol using Simple Object Access Protocol (HTTP SOAP) call, to retrieve the remote device IP address assigned by the access point 108. An HTTP SOAP call is an HTTP message that complies with SOAP encoding rules. A person of ordinary skill in the art would recognize that the HTTP SOAP call is only an example of a way of sending and receiving information over a network. The IP address of the remote device 102 can, for example, be associated with the remote device MAC address for enhanced authentication.

In one embodiment of the invention, multiple SNMP clients are used, as described above, to provide scalability for concurrent remote device authentication and can be extended to support a global solution where high latency is required by the access point 108 during authentication. For example, a Kiwi SNMP client may be used to filter and/or parse messages and take actions using script. Using a scripting language, such as, but not limited to, JavaScript, a script file can be created to parse a SNMP message to extract information passed from the remote device 102 through the access point 108 via the SNMP trap, remote device information such as, but not limited to, the MAC address, the remote device IP address, or the server IP address. Once extracted, the information can be sent for authentication. In one embodiment, this process may be done asynchronously to avoid bottlenecks of SNMP messages in the SNMP client(s).

In one embodiment of the invention, a webservice is used to communicate, for example, SNMP messages from one remote device to another through a network. A webservice is an application programming interface (API) that allows information to pass through one or more networks that may be using different communication protocols.

An example of an Authentication Webservice API could be designed to include the following elements: a AccessPoint-Information function, AuthenticateDevice function which Encapsulates the HTTP request made for NOC authentication, a ConnectionInformation function, a DeauthenticateDevice function which Encapsulates the HTTP request made for NOC deauthentication, a DeviceAssociated function which provides remote device identification and validation prior to authentication, and a DeviceDisassociated function which provides remote device identification and validation prior to deauthentication.

In this example, a DeviceAssociated method is called from the SNMP client. The request is first added to a queue to wait for processing. This may be beneficial if multiple SNMP clients attempt to authenticate the same remote device association, and can reduce the number of NOC authentication attempts to the access point 108. Upon a successful authentication the duplicate authentication requests are removed from the queue.

Continuing with the above example, after queuing individual requests, the parameters are then verified and corrected if necessary. The following process checks are done:
1. Is the gateway using a Virtual Private Network (VPN)? This is determined through a lookup in a VPN database. The VPN database is populated through a custom built script that is invoked for all connects and disconnects to the VPN.
2. Is the remote device IP address available? As discussed above, if the remote device IP address is not available through the SNMP trap used, then a HTTP SOAP call can be done to the access point 108 using the MAC address to retrieve the remote device's assigned IP address.
3. Is the remote device registered? Using the MAC address, a lookup is done in the service access module 112 that stores the user and/or remote device information, to locate the account that the remote device belongs to where the account can contain the RADIUS credentials, for example, the username and password, required for NOC authentication.

With regard to this example, once all parameters are verified and complete, the NOC authentication to the access point 108 is performed. The NOC authentication can be performed using, for example, an HTTPS call to the access point 108 with the required parameters, and the result is returned as a pass, fail, or error value. Access to selected services can be based on the result. For example, if the result is returned as a pass, access can be granted, whereas if the result is a fail or error value, access is not granted, and optionally the authentication procedure can be retried.

In one embodiment of the invention, the Advanced Device Profile (ADP) is stored in a knowledge base and used for authentication purposes.

In one embodiment, Express Authentication can be implemented using information stored in a knowledge base.

With an authentication system including multiple components, encompassing many different technologies, and spreading across multiple geographical locations, it may be effective to have a single and simple means to trace processing sequentially across all components for debugging and analytical purposes. A tracing webservice allows trace information to be sent unobtrusively as authentication moves through the process. A webservice, because of its interoperable characteristics and wide programmatic support among technologies, is one possible way to track the system process.

According to embodiments of the invention, authorization occurs once the remote device 102 and/or user have been authenticated, as described above. The system 10, via the network access module 106, or gateway 110 thereof (FIG. 2C), restricts the user and remote device to actions determined by the remote device's capabilities and/or the service package purchased by the user, as described in more detail below, by setting up firewalls, allowing or blocking specified TCP or UDP ports, filtering or restricting network traffic based on type, packet headers, content, flow characteristics such as rate, delay and variation thereof, source, destination and/or other access limitation rules to be implemented by the system 10. If the user selects the wide-open Internet access option, the user will have full access to the Internet, for example. Authorization can also operate by expressly allowing a user and/or remote device to carry out predetermined actions or connect to predetermined services, instead of specifying what actions are not allowed. The sets of allowed or restricted actions are described by a service profile, including for example authorization constraints or authorization whitelists.

In one embodiment, service profiles are dependent on factors such as the amount of time a user is accessing an application, the type or content of the application, rate and volume of data downloaded or uploaded, or other factors related to application usage. These factors can be in addition to other factors, such as allowing access to specified applications, to specified remote devices or remote device types, or at specified locations, times, or the like.

In another embodiment, service profiles can be configured to enable or disable selected applications or groups of applications, either directly according to application name or type, or indirectly by setting minimum or maximum service levels for selected services such as bandwidth, delay, enabled or disabled TCP or UDP port numbers, firewall settings, and the like, where said service levels are required for certain degrees of performance of selected applications, to which a value may be associated. These factors can be in addition to other factors, such as allowing access to specified applications, to specified remote devices or device types, or at specified locations, times, or the like.

In one embodiment, in order to influence or control access to prespecified applications or services, different applications or services can be profiled. To profile an application or group of applications, the type and level of communication resources associated with usage of said application or group of applications is determined, such as TCP or UDP port usage, bandwidth, packet size, traffic characteristics, and the like. This association can be performed through controlled experimentation or monitoring of customer activity. The association between applications and type and level of communication resources is then stored in an application profile in a knowledge base. The application profile can subsequently be used to substantially monitor and/or restrict users to predetermined applications or groups of applications by monitoring and/or restricting access or usage to the associated types and levels of communication resources. Profiling of applications can be performed automatically according to an adaptive or automated procedure, or by a network administrator, or by a combination thereof.

In an optional embodiment of the invention, the system 10 uses a value based application (VBA) which provides limited access to an exclusive application, service, or remote device connection, or a combination thereof, that is packaged, marketed, and sold at a hotspot at a price representative of its perceived value, which is discounted from wide-open Internet access that is currently provided.

Using VBA service profiling, the system 10 can be configured to identify incoming traffic substantially without user input, recognize returning users and remote devices by type, connect users with a single click, or no clicks, such as by Express Authentication, and apply rules post-authentication to allow only that type of remote device, or a service on that remote device, to connect. By possessing this functionality it is possible to assemble creative packages of service offerings which allow users to pay for only the services they will use. Alternatively, users can obtain some services for free, or obtain services at no charge or at a reduced price when another good or service is purchased. In this way, targeted marketing can also be performed in conjunction with user services in embodiments of the invention.

In one embodiment, service profiles can be applied to determine what services to connect a user to, and the conditions required for each service. Service profiles can restrict, allow, or otherwise configure access to applications based on various factors. For example, service profile parameters can pertain to date and time ranges, remote devices, remote device types or remote device classes, for example as indicated in remote device profiles, geographic locations, hotspot or business entity identification, types of VBA services available, number of users accessing services, available bandwidth, concurrent use of multiple remote devices by a user or group of users, session idle time or timeouts, or other parameters affecting access to services, applications or VBAs as would be understood by a worker skilled in the art.

In one embodiment, service offerings can be related to providing access to one or more applications under predetermined time, quality, or other restrictions. Service offerings need not be identified with a particular application, but can be defined by potential combinations of service profile parameters such as authorization constraints or authorization whitelists. For example, a communications service provider A and an internal access service provider and product vendor B could devise a product whereby users of remote devices affiliated with A, who also purchase a product or service from B using a stored-value card, could get 1-hour free open Internet access through B at selected vendor locations on the day they make the purchase. Another communications service provider C could offer users of remote devices affiliated with C free access (or access for a nominal charge, or free access with another purchase) at selected hotspots to their Facebook account, provided the users have purchased a qualifying service plan.

Once logged into a profile, for example through an access management module, the user can have the option to, among other functions, add remote devices. Upon selecting a remote device, the user enters information required to register that particular remote device into their account. Once registered, the user selects the service package that suits his needs, and selects a payment option, and then the user can use the remote device at any hotspot access supported by system 10.

In one example, the VBA constructions define specific gateway firewall requirements for each product. By identifying settings of the servers, transports, or ports used by the remote devices and services supported by the system 10, which may include for example, but are not limited to computing devices, games, streaming video products, collaborative business applications, social applications, etc. In one embodiment, there are created Access Control Lists (ACLs) that provide proper access support for each VBA, while restricting access to other common services for which the user has not paid. These restrictions may occur at the gateway 110 level, for example, using firewalls to limit access to certain Internet and other network capabilities.

In another embodiment of the invention, the restriction of network access may occur through funneling all user traffic through a central proxy server. This method of limiting network access according to a VBA would allow for more control, for example, of the authorization process.

In one embodiment, in order to create limited-access VBA profiles, as described above, Internet access requirements for each of the applications to be supported including servers, ports, protocols, etc. which could be used by a remote device during the execution of a certain application are identified. For example, a game on the Nintendo DS™ may require access to a Nintendo™ server, over TCP, using port 1025 outbound and 1030 inbound. An inventory for each application's connectivity requirements is used in order for the applications to be combined into product packages, the VBAs, and their requirements combined. The amalgam of the requirements for each package form the basis for firewall rules for a specific VBA. These application profiles contain information about various characteristics of each application or remote device which describe not only how the application behaves on the Internet, but unique characteristics of the remote devices which would allow instant and automatic detection of the remote device type and link a specific remote device to a unique user. These application profiles can comprise a dynamic database. For example, with new applications and remote devices being introduced, constant updating may be implemented to support new remote devices, and to ensure that users do not have problems with a new software program or application on older remote devices.

To restrict and/or prohibit access to all other available services the user did not select, for example, a user who pays for online gaming should not be able to browse the Internet or send email, requires a proper set of firewall rules for any VBA, by permitting everything required for that VBA to function, and blocking access to everything else. These firewall rules can be established based on transport protocols (e.g. TCP, UDP, ICMP, etc.), destination server (e.g. IP or DNS name), port number, traffic protocol (e.g. SMTP, FTP, HTTP, etc.), header information, etc. By combining a set of permitted servers, ports, protocols, and the like and restricting others, the firewall configuration for any one VBA can be determined.

In one embodiment of the invention, to facilitate the post-authentication user restrictions at a hotspot, manipulation of the functionality of the gateway 110 provided is desirable. For example, some manipulation of the "access-list" attribute, which is a vendor-specific attribute used by the Colubris™ Multi-Service controllers (MSC-3200), could be used. Allowed and disallowed IP address and port combinations can make up an access-list definition which is associated to an account/remote device combination and enforced by the access point 108.

An example of such manipulation of an "access-list" attribute is described in the following steps:
(1) determining in advance a selection of packaged VBAs, and the firewall rules needed to operate them;
(2) establishing those rules in the start-up profile of the network access module 106 (e.g. gateway 110) in the form of an "access-list" such that each time the unit connects to the Internet, or at a given refresh rate (e.g. once per day), it would download instructions for "DS Gaming", "PSP", etc.; these instructions could be read into memory by the gateway 110, but not applied, for example, until called by a user connection; and
(3) upon login, programmatically determining the subscribed VBA for that user; and 61] (4) calling the appropriate access-list profile for that user and activating it at the gateway 110 for that session.

The remote device profiles for each service package can be stored in a database (e.g. knowledge base 210 of FIG. 2B), and combined with one or more user profiles, a list of associated remote devices, a list of service subscriptions, or a combination thereof, to form a service profile for that user or remote device, as described above. When a user logs in, or a remote device 102 is recognized at the time of connection, the system 10 is able to look up the service profile for that user and/or remote device, determine the appropriate level of access, and apply the profile to the current connection by configuring the appropriate firewall rules at the gateway 110 following authentication.

As will be appreciated by the person of skill in the art, the system 10 may further comprise a reporting module used by network access providers, and other partners, for reporting data related to system usage analysis and billing purposes. Reports may include information regarding, for example, usage by user, location and vendor; usage by remote device type; payment type; and other such information, as would be apparent to the person skilled in the art.

It will be further appreciated that various upsell mechanisms, as described above, may be implemented so to actively upgrade a user's, or a remote device's service access package while interfacing with the system.

Figure 4:
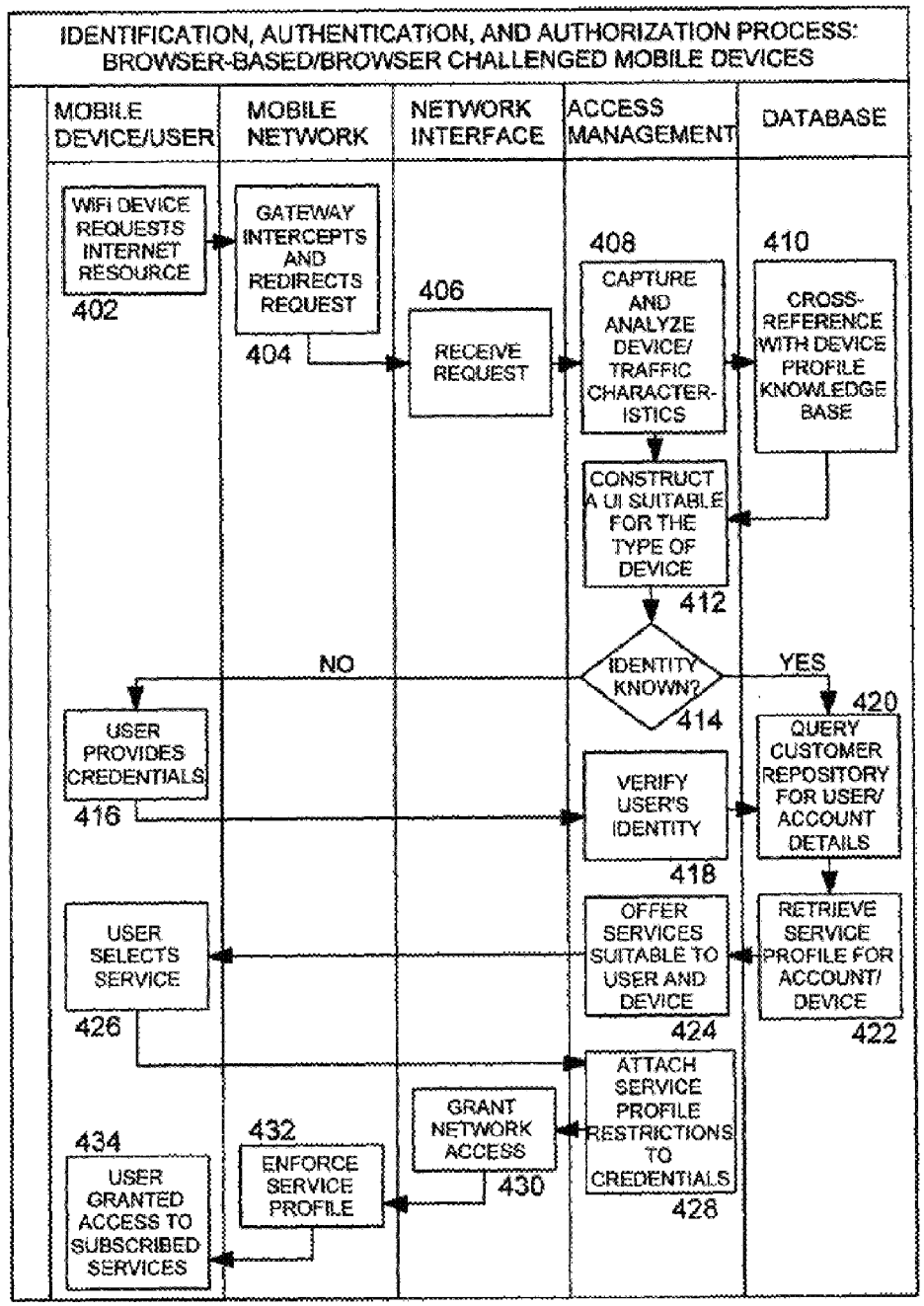
FIG. 4 is a flow diagram depicting a process of identifying, authenticating, and authorizing a user with a browser-based or browser challenged mobile or remote device, in accordance with embodiments of the invention.

With reference to FIG. 4, and in accordance with one embodiment of the invention, there is shown a flowchart providing a process for identifying, authenticating, and authorizing a user utilizing a browser-based or a browser challenged remote device 102 to access a network 104. In this example, the remote device 102 scans the area for an available network connection. The user invokes a web browser via which a given Internet resource may be requested at step 402. The gateway 110 intercepts the request and redirects it to the network interface at step 404. The gateway 110 also sends through the network the remote device characteristics that it has extracted from the remote device 102 at step 404. The network interface receives the request to access the network and the remote device information and sends the request on to an Access Management Module (e.g. of service access module 112 of FIG. 2B) at step 406. The Access Management Module captures the remote device and user information and analyzes the remote device characteristics to determine what information the gateway extracted at step 408. The remote device information is cross-referenced with the database containing user, remote device, and service profiles at step 410. The Access Management Module determines what type of remote device is being used to access the network and reformats the User Interface (UI) to suit the remote device's capabilities at step 412. At step 414, the process determines whether the user is known. If the user information was sent with the request, the Access Management Module sends that information to the database to retrieve the user's account details at step 420. If the user information was not sent with the request, the intercept page is sent to the remote device so the user can input their user information at step 416. The user's information is sent back to the Access Management Module at step 418 and the information is cross-referenced with the account details in the database to verify the user has an account at step 420. The database determines what service profile the user has access to through the current remote device the user is using at step 422. The process sends the available service options to the remote device through an appropriate UI at step 424, and the user selects which services to allow at step 426. The process selects the appropriate service credentials and restrictions at step 428, and sends that information through the network interface at step 430, to the gateway to enforce those restrictions at step 432. The user is granted access to the network limited to the service profile the user subscribed to at step 434.

Figure 5:
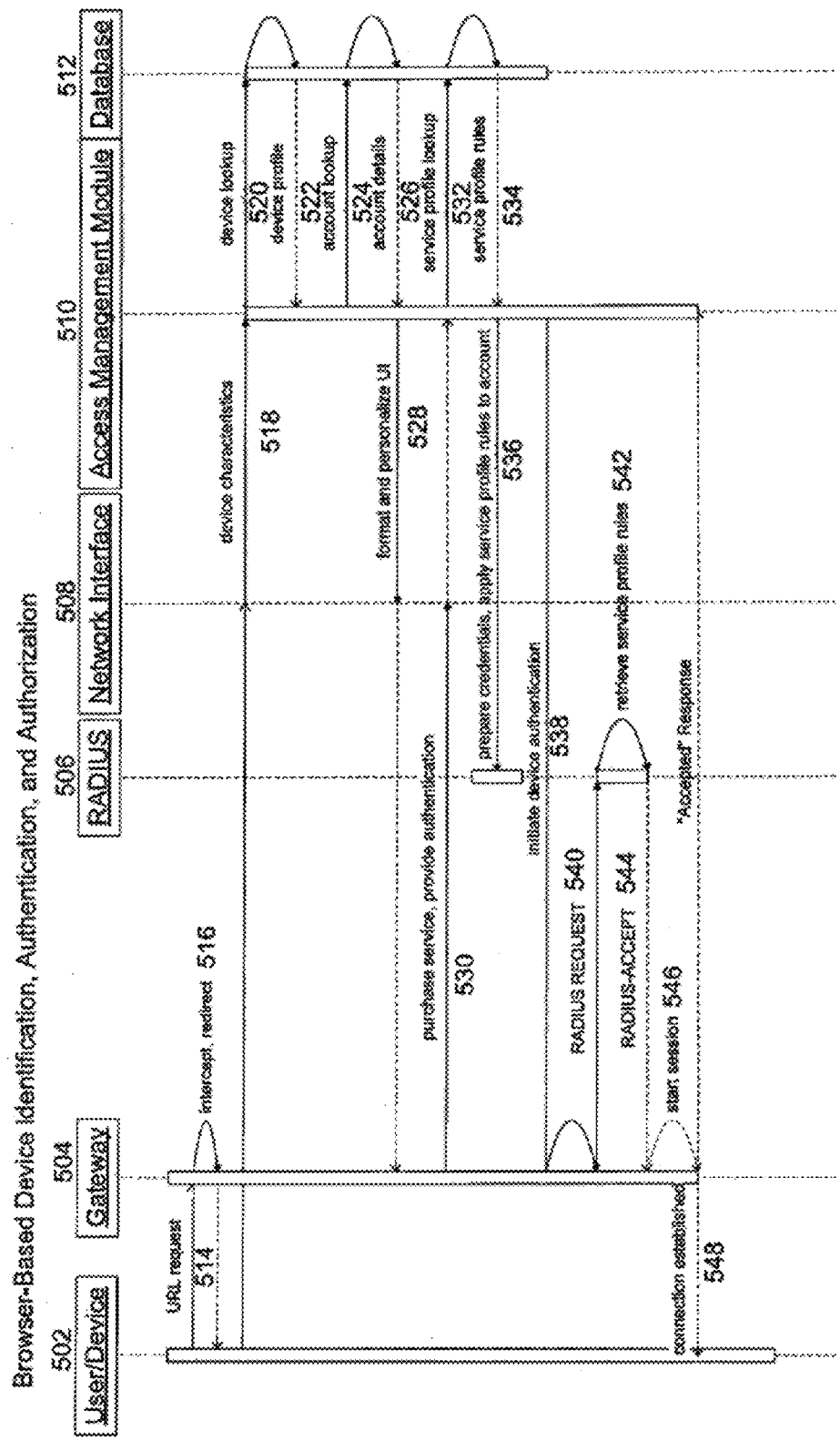
FIG. 5 is a sequence diagram depicting communications between components of the system of FIG. 1, for identifying, authenticating, and authorizing a user with a browser-based or browser challenged mobile or remote device, in accordance with embodiments of the invention.

With reference to FIG. 5, and in accordance with one embodiment of the invention, there is provided a sequence diagram providing a process for identifying, authenticating, and authorizing a user to access a network interface 508 using a browser-based or browser challenged remote device 502. The user, via the remote device 502, sends a URL request to access the network (step 514), the gateway intercepts the request and redirects the request back to the user via an intercept page (step 516). The user inputs user information through the form provided on the intercept page, and this information is sent to the Service Access Module, whereby remote device characteristics may be further extracted from remote device communications, for use by the Access Management Module 510 (step 518). The Access Management Module 510 first looks up the remote device characteristics in the database 512 (step 520) for a matching remote device profile stored in the database 512. The database 512 sends the remote device profile back to the Access Management Module 510 (step 522). The Access Management Module 510 then looks for an account profile that matches the remote device profile to compare user information (step 526). Once an account profile is found, the process formats the User Interface (UI) to suit the remote device being used (step 528) and sends a web page displaying available service options for that user and remote device to the user so the user can select the required services. The user selects the required services and selects payment options, and that information is sent back to the Access Management Module 510 (step 530) to be cross-referenced with the service profiles stored in the database 512 (step 532). A service profile is selected and the service profile rules are sent to the Access Management Module (step 534). The user's credentials in the RADIUS database are updated, and the rules of the service profile are associated with the credentials (step 536). The remote device information is sent back to the gateway 504 to initiate authentication of the remote device 502 for the services selected (step 538). The gateway 504 makes a RADIUS request to authenticate the remote device for the services selected (step 540). The RADIUS server checks the credentials and retrieves the associated service profile restrictions (step 542). The RADIUS sends an "accept" message back to the gateway 504 (step 544), accompanied by the service profile restrictions to be enforced by the gateway 504. A network session is created (step 546) and the user can establish a connection to the network 508 (step 548).

Figure 6:
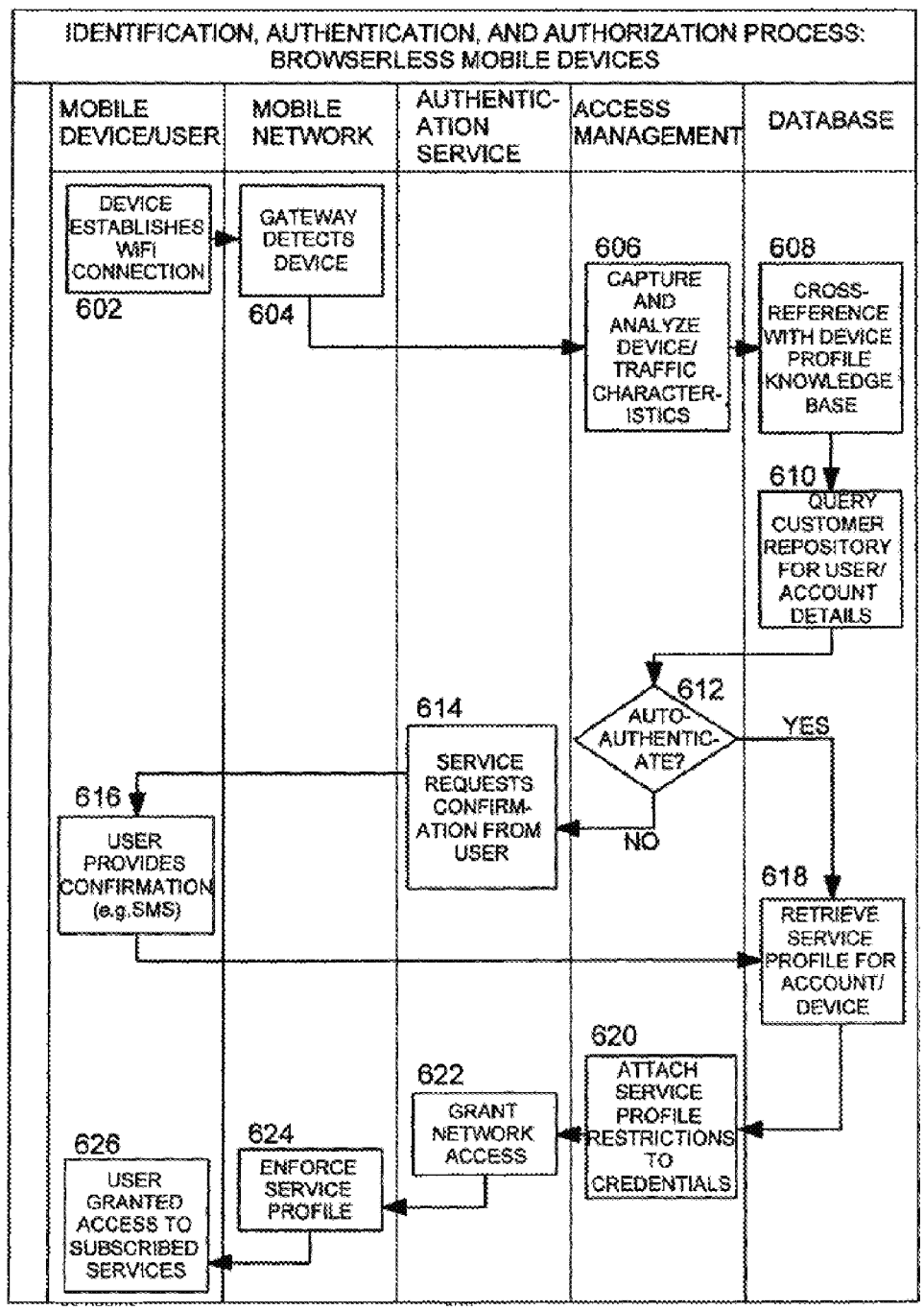
FIG. 6 is a flow diagram depicting a process of identifying, authenticating, and authorizing a user with a browserless mobile or remote device, in accordance with embodiments of the invention.

With reference to FIG. 6, and in accordance with one embodiment of the invention there is shown a flowchart providing a process for identifying, authenticating, and authorizing a user utilizing a browserless remote device 102 to access a network 104. The remote device 102 scans for an available network connection at step 602. The gateway 110 detects the remote device scanning for a network at step 604, and forwards the remote device information to the Access Management Module to be extracted thereby. The Access Management Module captures and analyzes the remote device characteristics to determine which remote device is being used to access the network at step 606. The remote device characteristics are cross-referenced with remote device profiles stored in a database at step 608. The database is also searched for the user account profile, if one exists, at step 610, and it is determined whether the user has previously programmed the account profile to auto-authenticate when the user accesses the network at step 612. If the user has not selected to auto-authenticate, the authentication service requests confirmation from the user at step 614. The user provides user information to confirm user account information using Short Message Services (SMS) which are text messages that can be sent using devices, such as but not limited to, cell phones and pocket PCs, at step 616. The user information received from the user and remote device 102 is cross-referenced with service profiles established for the account and remote device profiles which are stored in a database 112 to determine the appropriate services to make available at step 618. The Access Management Module determines the credentials and restrictions of the selected service profile and sends those to the authentication service at step 620. The authentication service verifies the user account, remote device, and service profiles and grants network access to the user at step 622. The gateway provides the enforcement of the service profile to allow the user to only access services provided for the remote device they are using at step 624. The user is provided restricted access to the network in accordance with the services the user has provided payment for at step 626.

Figure 7:
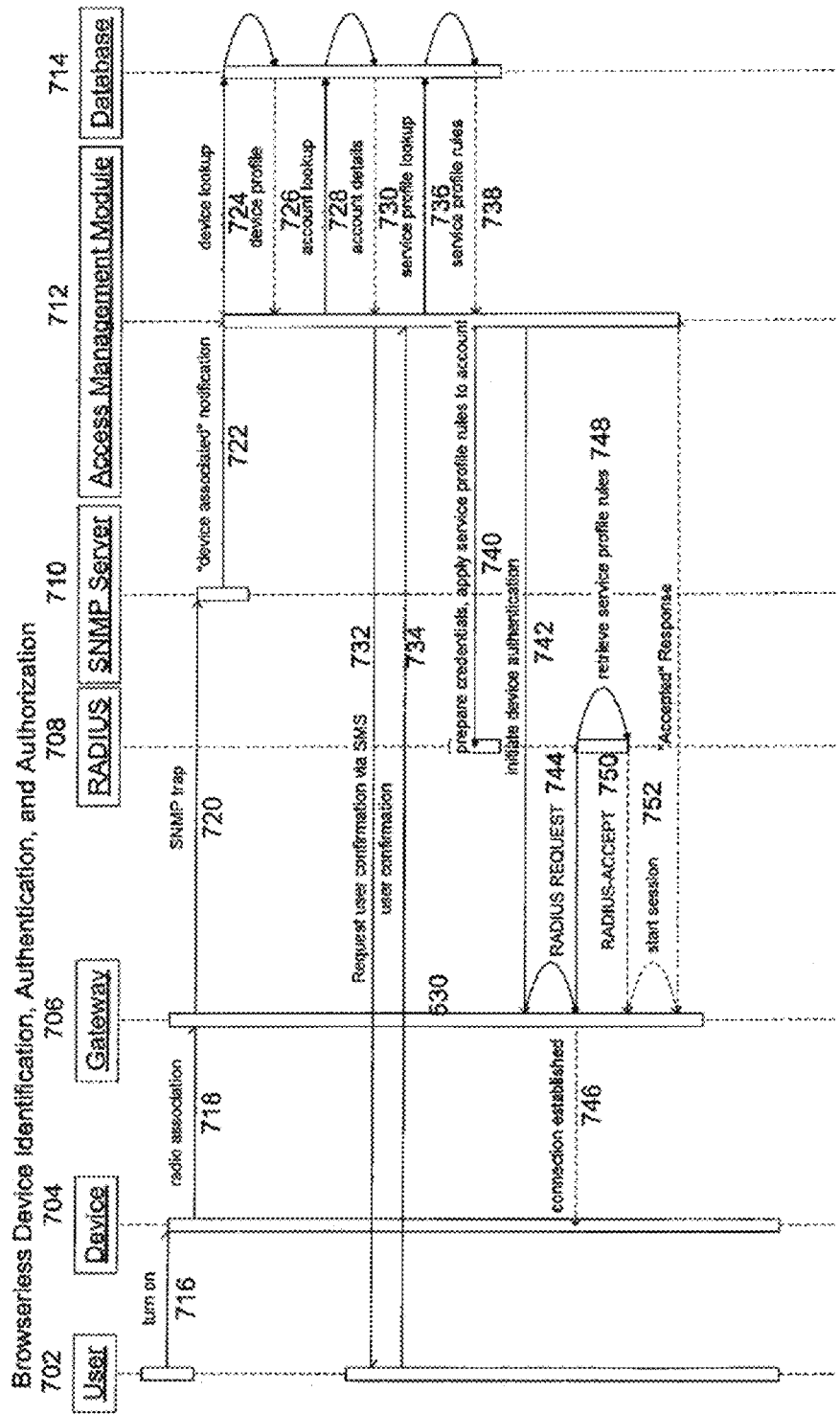
FIG. 7 is a sequence diagram depicting communications between components of the system of FIG. 1, for identifying, authenticating, and authorizing a user with a browserless mobile or remote device, in accordance with embodiments of the invention.

With reference to FIG. 7, and in accordance with one embodiment of the invention, there is shown a sequence diagram providing a process for identifying, authenticating, and authorizing a user utilizing a browserless remote device 102 to access a network 104. A user 702 at a hotspot access location turns on a browserless remote device 704, for example, but not limiting to, a mobile phone (step 716). The remote device attempts to make a radio access network (RAN) connection to the available network (step 718). The gateway 706 creates a SNMP trap to extract remote device information from the remote device (step 720). The SNMP "device associated" notification is sent from the SNMP Server 710 to the Access Management Module 712 (step 722). The Access Management Module 712 cross-references the remote device characteristics with the remote device profiles stored in the database 714 (step 724). Once a remote device profile is established, the Access Management Module 712 looks in the database to see if there is an account profile associated with the remote device profile (step 728). The account profile details are sent from the database 714 to the user 702 requesting the user to confirm the account details (step 732). The user provides user information to confirm the account details through SMS, for example, and the information is sent back to the Access Management Module 712 (step 734). The Access Management Module 712 looks in the database 714 to acquire the appropriate service profile for the user and remote device (step 736). The appropriate service profile is selected from the database 714, and the service rules are sent to the Access Management Module (step 738). The user's credentials in the RADIUS database are updated, and the rules of the service profile are associated with the credentials (step 740). The remote device information is sent back to the gateway 706 to initiate authentication of the remote device 704 for the services selected (step 742). The gateway 706 makes a RADIUS request to authenticate the remote device for the services selected (step 744) while a connection is established with the remote device (step 746). The RADIUS server checks the credentials and retrieves the associated service profile restrictions (step 748). The RADIUS sends an "accept" message back to the gateway 706 (step 750), accompanied by the service profile restrictions to be enforced by the gateway 706. The gateway 706 then initiates a session (step 752) feeding back to the access management module (step 752).

Figure 8:
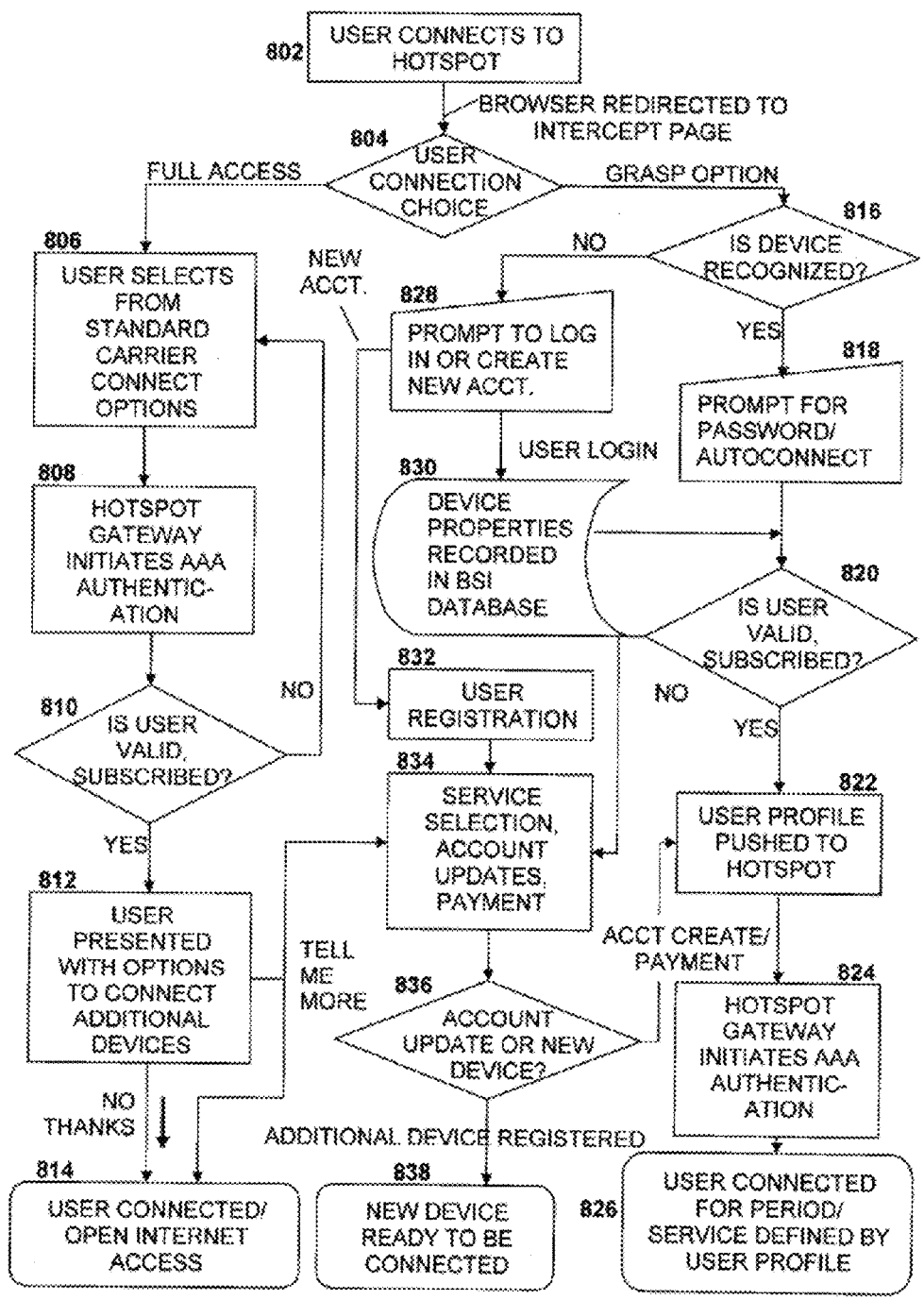
FIG. 8 is a flow diagram depicting a method of accessing wireless services using a browser-based remote device, in accordance with embodiments of the invention.

With reference to FIG. 8, and in accordance with one embodiment, there is provided a flowchart of steps taken when a user attempts to access a network at a hotspot location, using a browser-based remote device. The user enters the hotspot location, and turns on the remote device, the remote device scans for available networks, and the user opens a web browser at step 802. The user selects whether to have full access to the network or to have a service package option, at step 804. If the user chooses to have full access to the network, the user selects the connect options provided by a carrier at step 806. The gateway initiates authentication of the user through the use of RADIUS at step 808. The gateway confirms whether the user is a valid user at step 810, if the user is authenticated, the user is given options to connect additional remote devices to the network at step 812, which would then forward them to the service package options provided at step 834. If the user chooses not to connect additional remote devices to the network, the user is connected to the Internet with wide open access at step 814.

If, at step 804, the user chooses to have access to the network based on a service package, the system attempts to recognize the remote device being used to access the network at step 816, if the remote device is recognized, the user is prompted through the web browser to input user information or the user can select to auto-authenticate, at step 818. If the user is a valid subscriber, as determined at step 820, the user profile is passed to the hotspot network access at step 822. The gateway initiates the authentication of the user, remote device, and service profiles at step 824, and allows the user to have access to the network for the services selected in the service package at step 826. If the remote device being used is not recognized at step 816, the user is prompted to login or create a new account using the web browser at step 828. If the user has previously registered an account, the user logs on, and the remote device characteristics are then stored in a remote device profile associated with that user at step 830.

If the user is a new user, they are required to create a new account at step 832. The user selects the type of service package, and payment option from the list displayed at step 834, and the account is created, and updated at step 836, and the remote device being used can then be connected to the network at step 838. The account information is sent to the hotspot network access at step 822, and the gateway initiates the authentication of the user, remote device, and service profiles at step 824, and allows the user to have access to the network for the services selected in the service package at step 826.

Figure 9:
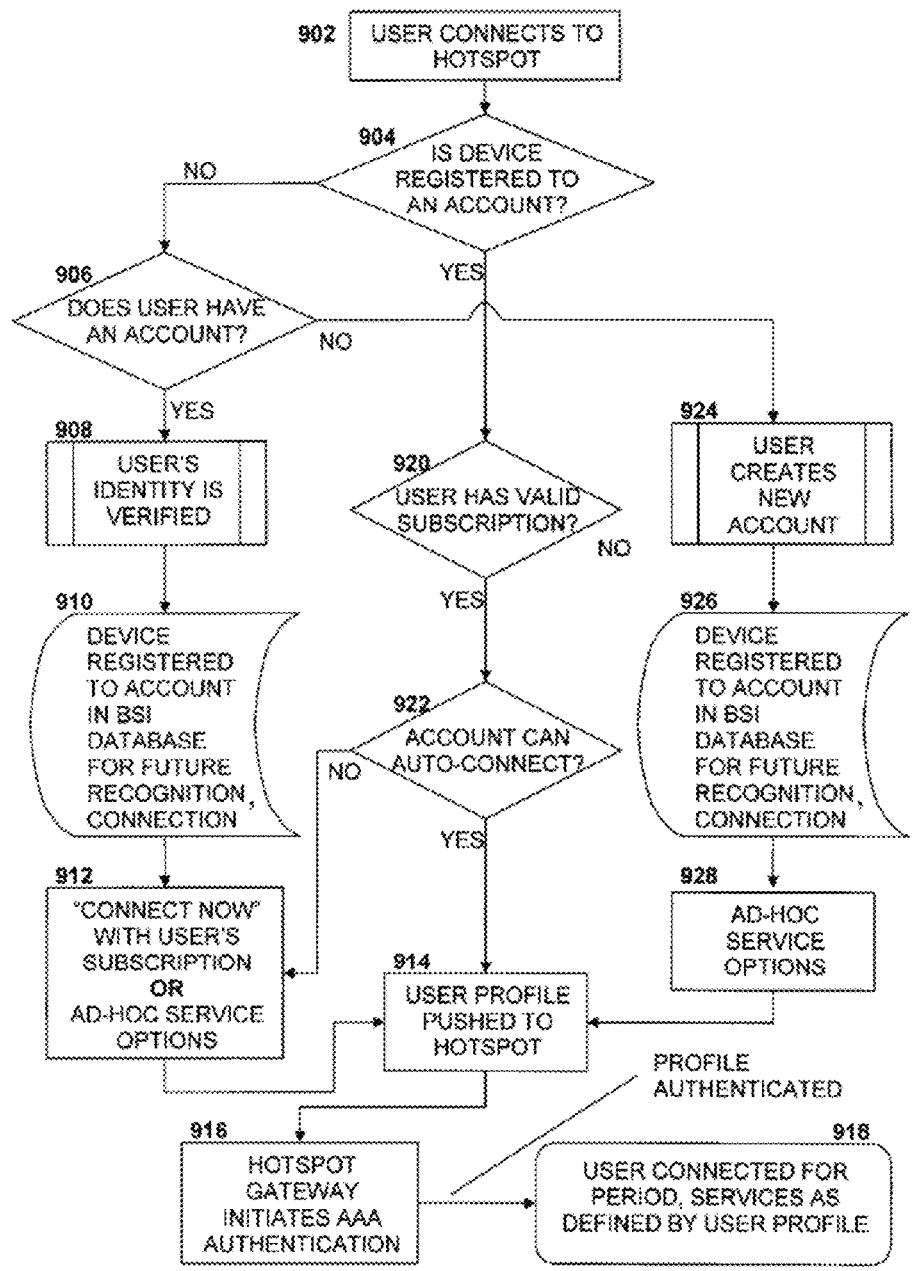
FIG. 9 is a flow diagram depicting a method of accessing wireless services using a browser-challenged remote device, in accordance with embodiments of the invention.

With reference to FIG. 9, and in accordance with one embodiment of the invention there is provided a flowchart of steps taken when a user attempts to access a network at a hotspot location, using a browser challenged remote device. The user enters the hotspot location, and turns on the remote device, the remote device scans for available networks, and the user invokes a web browser at step 902. The service access module extracts information from the remote device to determine whether it is a registered remote device, at step 904. If the remote device is not a registered remote device, the gateway receives information from the user to determine if the user has a valid account at step 906. The user's information is sent to be authenticated at step 908. If the user is verified as a valid user, the remote device information is then stored as an associated remote device at step 910. If the user's service package already provides sufficient access to the network for that particular remote device, the user can connect to the network, or the user has to select service options from a list displayed on the web browser at step 912. The account information is sent to the hotspot network access at step 914, and the gateway initiates the authentication of the user, remote device, and service profiles at step 916, and allows the user to have access to the network for the services selected in the service package at step 918.

If the remote device is already registered to an account as determined at step 904, the user inputs user information at step 920. If the user information is valid, the user can select to auto-connect at step 922, or require the system to ask the user whether they wish to connect at step 912. The account information is sent to the hotspot network access at step 914, and the gateway initiates the authentication of the user, remote device, and service profiles at step 916, and allows the user to have access to the network for the services selected in the service package at step 918.

If it is determined at step 906 that the user does not have a valid user account, the user creates a new account at step 924. The remote device is registered to the user's remote device profile at step 926, and the list of service options is displayed at step 928.

The account information is sent to the hotspot network access at step 914, and the gateway initiates the authentication of the user, remote device, and service profiles at step 916, and allows the user to have access to the network for the services selected in the service package at step 918.

Figure 10:
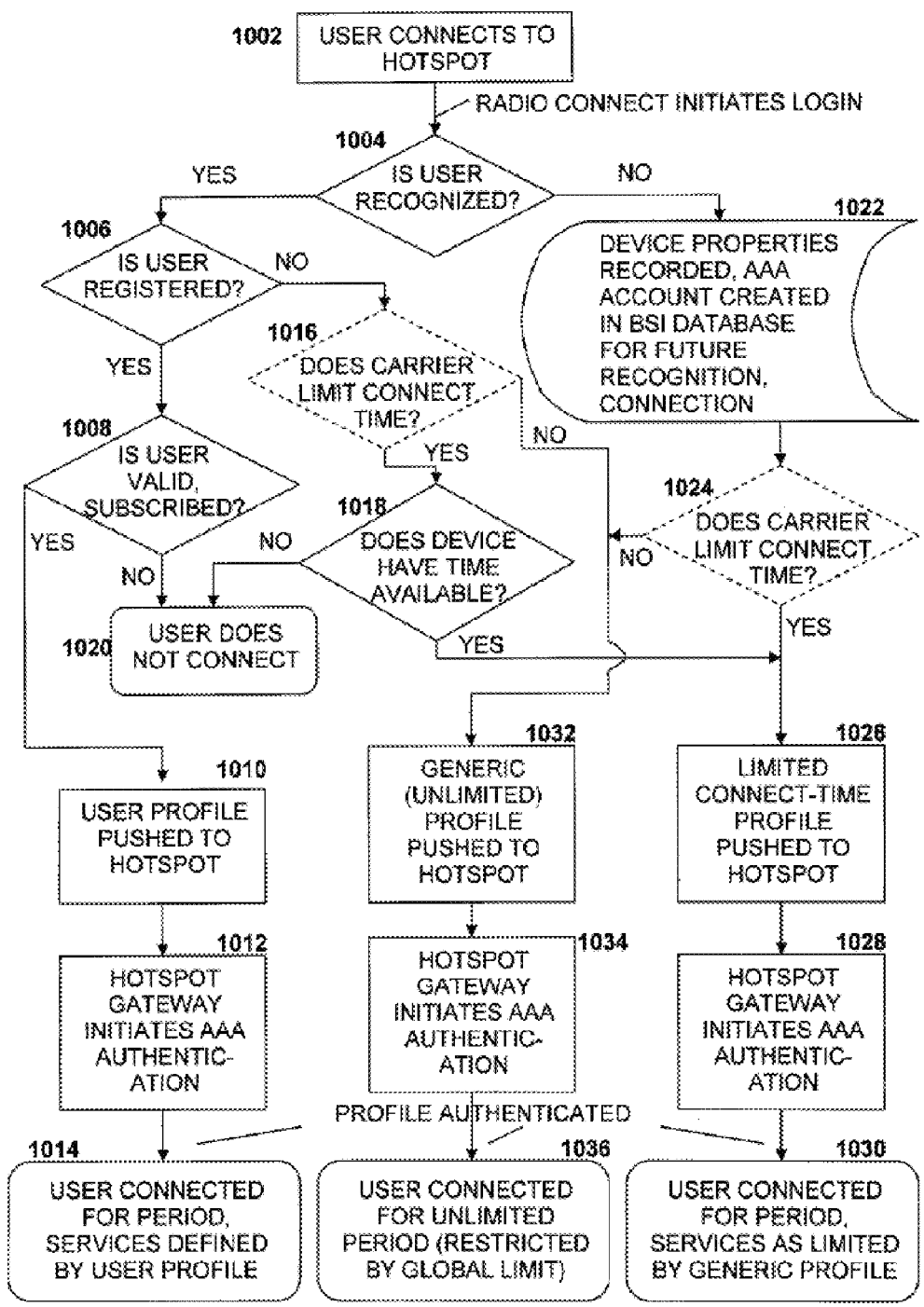
FIG. 10 is a flow diagram depicting a method of accessing wireless services using a browserless remote device, in accordance with embodiments of the invention.

With reference to FIG. 10, and in accordance with one embodiment of the invention, there is provided a flowchart of steps taken when a user attempts to access a network at a hotspot location, using a browserless remote device. The user enters the hotspot location, and turns on the remote device, the remote device scans for available networks, and the user begins a text message session and uses a radio access network to connect to the network, at step 1002. The gateway determines whether the user is a recognized user at step 1004. If the user is recognized, it is determined whether the user has a registered account at step 1006. If the user has a registered account, it is determined whether the user has a valid service subscription for the remote device being used at step 1008. If the user has a valid subscription for the remote device being used, the account information is sent to the hotspot network access at step 1010, and the gateway initiates the authentication of the user, remote device, and service profiles at step 1012, and allows the user to have access to the network for the services selected in the service package at step 1014.

If it is determined at step 1006 that the user is not a registered user, the system checks if the connection available to the remote device is time limited at step 1016, if it is time limited, the system checks if the remote device being used has time available at step 1018. If the remote device has no time available, the user will not be allowed to connect to the network (step 1020). If the connection available is time limited, and the remote device has time available, the limited remote device profile is sent to the hotspot network access at step 1026, and the gateway initiates the authentication of the remote device at step 1028, and allows the user to have access to the network for the limited device-specific services at step 1030. If the connection available is not time limited at step 1016, the open access to the device-specific network connection is sent to the hotspot network access at step 1032, and the gateway initiates the authentication of the remote device at step 1034, and allows the user to have open access to the network for the device-specific services for an unlimited amount of time, at step 1036.

If it is determined at step 1004 that the user is not a recognized user, the remote device characteristics are extracted and stored as a remote device profile in a database at step 1022. The remote device attempts to connect to the available network for device-specific access, at step 1024 if the connection available has a time limit the limited remote device profile is sent to the hotspot network access at step 1026, and the gateway initiates the authentication of the remote device at step 1028, and allows the user to have access to the network for the limited device-specific services at step 1030. If the connection available is not time limited at step 1024, the open access to the device-specific network connection is sent to the hotspot network access at step 1032, and the gateway initiates the authentication of the remote device at step 1034, and allows the user to have open access to the network for the device-specific services for an unlimited amount of time, at step 1036.

The above provides for different examples in which device-identifying data can be used to not only manage wireless network access at different hotspot locations by remote devices at such locations, but also to uniquely recognize and optionally track and report on device activity by way of the creation and management of a device profile uniquely associated with such devices and stored in a network accessible knowledge base. Accordingly, and as described above within the context of system 10, devices interfacing with a network access module 106 or WAP 108 at a given hotspot may, in some embodiments, be automatically identified and recognized by the system 10. Namely, a unique device identifier is automatically embedded within a device transmission without user input and thus communicated by the device to this WAP 108. Upon cross-referencing this device identifier with device profiles stored at a common knowledge base 210, a match can be made and the device ultimately recognized. Upon identifying an unrecognized device, a new device profile may be created from the unique device identifier extracted from communications received from this unrecognized device, thus allowing for subsequent recognition, and thus optionally tracking, of this particular device. From these compiled device profiles, device usage patterns (usage time, location, etc.) can be logged and reported, for example.

Within this context, a given device can be recognized as a returning device when subsequently identified at a same location, thus indirectly identifying the user of this device as a potentially frequent or loyal customer. Similarly, a given device may be recognized upon identification at one of multiple hotspot locations having common access to the network accessible knowledge base. In one such embodiment, frequent or loyal customers (or at least their device), can be recognized across multiple hotspot locations, for example grouped or otherwise associated with a common operator, brand, business entity, or the like. Various applications, such as the tracking and reporting on repeat devices, the provision of improved services or offerings to such repeat devices, and other such applications as exemplified below, may be derived from the ability to identify and recognize devices across multiple hotspot locations, in some embodiments, without user input, that is in some cases, unbeknownst to the user of the device.

FIG. 13 provides another example of a system 1300 generally configured to provide remote devices 1302 access to network services, such as the Internet, from a public hotspot 1306 or the like. In this particular example, the system 1300 is configured to authorize full access privileges to authenticated users, though it will be appreciated that restricted access or access to only some services may also be considered, as described above, within the context of this example.

In this particular example, the device recognition and tracking features of the above-described embodiments are further exemplified. Namely, the system 1300 is generally subdivided into a detection component 1320, whereby remote devices 1302 in the vicinity of a given hotspot 1306 may be detected and automatically identified by way of a unique device identifier automatically embedded within a device transmission, and a data engine component 1322 for processing device identities, optionally in combination with time and location data, to provide for device recognition, tracking and other such features, as introduced above and as further exemplified below. In this particular example, the detection component 1320 comprises a hotspot radio receiver 1306, such as a WAP or other such wireless sensor, which receives wireless transmissions from the devices 1302 in its vicinity and communicates these transmissions to a centralized controller 1310 (e.g. via a gateway). The controller 1310 (an example of which may include, but is not limited, to an Aruba 3200 Controller) is generally configured to relay raw transmissions received by different hotspot sensors 1306 to a listener 1312, which generally comprises one or more dedicated software modules that extract one or more unique device identifiers from these transmissions for use downstream in identifying and recognizing devices during subsequent visits at a same or other hotspot associated with system 1300. In this particular embodiment, the listener 1312 is generally characterized as a packet listener (e.g. implemented in the context of packet capture—PCAP), but may also be characterized as a Real Time Tracking System (RTLS) processor in which an RTLS data stream is processed to extract similar data, and optionally, provide access to signal strength data in further characterizing proximity of an identified device. Other such listeners currently available or that may evolve in the field to provide similar functionality will be understood to fall within the general scope and nature of the present disclosure. In some embodiments, the unique device identifier comprises a value representative of an inherent characteristic of the device, such as a MAC address, that is automatically embedded within device transmissions without user input, and in most cases, unbeknownst to the user. Namely, the unique identifier extracted by the system 1300 is generally specific to the device itself and not pre-designated for the purpose of wireless network access or user identification, but rather integral to the device itself in identifying this device, for example, in allowing for the addressing of wireless communications thereto by nearby or associated devices.

In one such embodiment, the hotspot 1306 is programmed to listen for probe requests transmitted by devices actively scanning for available networks. These types of packets are periodically broadcast by Wi-Fi client devices (part of the IEEE 802.11 standard) in seeking to identify available network connections. Contained in such probe requests is a value that uniquely identifies each device (its MAC address) so that replies can be addressed specifically to that device. In this particular embodiment, the hotspot sensor 1306 forwards identified probe requests to a centralized controller 1310 (e.g. delivered in its raw form to a remote server) for processing by listener 1312.

In this particular embodiment, the packet listener 1312 listens for incoming packets and extracts the MAC address of the client device 1302 that originally issued the probe request, the IP address of the access point (sensor) 1306 that detected the packet, and the timestamp of the packet, for example. As introduced above, extraction of the MAC address allows for unique identification of the device 1302 at the hotspot 1306, and extraction of the IP address and time stamp allows, in some embodiments, for the identification of the hotspot location and thus the identified device's location, and the time to be associated therewith. For instance, the IP address can be cross-referenced with a database of known access points to determine which location it corresponds to. Similarly, the extracted device identifier can be cross-referenced with stored device profiles such that repeat visitors can be recognized upon subsequent visits to the same or related locations, or again at unrelated locations for the purpose of expanding the device profile database across multiple operators (device profile sharing rules between entities may be set in place to protect user privacy and the like, as will be readily appreciated by the person of ordinary skill in the art). Combination of the device ID, location ID, and timestamp thus provide an indication that a particular device 1302 was present at a particular location at a particular time.

In one embodiment, the extracted data can be used to recognize and thus track devices over time at different locations, and can also be used to generate and maintain an in-memory map of where each recognised device is, and optionally how long it has been there. From this point, the data can be sent, for example at regular intervals, to an M2M service module 1314 that aggregates packet capture data, optionally with other forms of presence information, to create a high-level picture of which devices are present at which locations, and for how long. This information can be stored in a knowledge base (KB) database 1316 from where it can be used for various purposes such as reporting, business analytics, and diagnostics, to name a few. The M2M module 1314 may also be used to pass events to external subscribers for real-time notification and/or reporting, for example.

In some embodiments, device identification and recognition, device profiling, and as will be described in greater detail below, device visit profiling, may be implemented internally by a given entity operating a local, regional or global hotspot locations (e.g. at a single location, at any of a group of commonly operated regional locations, and/or globally across multiple locations), or again implemented by a third party hotspot operator, which may service multiple hotspot operating entities in providing each one with respective and customized data in respect of devices identified/recognized at their service locations and/or across the entire serviceable network of hotspots.

In the context of FIG. 13, third party operations may thus share resources between commonly operated hotspot locations, or again between distinct customers, by centrally processing packet captures and/or other detection events (e.g. RTLS), or again by centrally processing event data in compiling respective visit profiles, managing device profiles across multiple customer platforms, and managing respective rules engines (e.g. see FIG. 15) for different consumers in delivering customized data, as appropriate. In such embodiments, again, privacy regulations may be implemented to limit exchange of data between consumers, for example where different levels of engagement have been recorded for a given device from consumer to consumer (e.g. an opt-in device may authorize access to personal information in respect of a particular hotspot operator, but may be set to operate anonymously in respect of another).

Similarly, while third party resources may be used exclusively for the provision of hotspot network access and device data acquisition and processing, leaving downstream application implementation to the consumer, other embodiments may redirect consumer actions back through the third party system for direct interaction with user devices. Either way, different privacy protocols may be implemented to reduce direct user device exposure to the consumer, thereby protecting a user's privacy and anonymity, particularly where a user's device's interactions have been limited to unsolicited packet captures, or the like. In such examples, a MAC address automatically extracted from anonymous device transmissions may still be used to compile activity data, and optionally provided for downstream use via a hashing protocol, thereby avoiding direct disclosure of the anonymous MAC address to the consumer. These and other such privacy settings will be readily apparent to the person of ordinary skill in the art and are likely to vary from area to area based on evolving local privacy regulations and the like.

As introduced above, other techniques may also be used, in conjunction with basic device detection and recognition, to supplement device tracking and further develop the knowledge base. For example, while device identification and recognition may be implemented via packet capture of probe requests, as noted above, other packet captures and/or logging/tracking techniques may also or alternatively be used in conjunction therewith to automatically access a greater representation of user activity. For example, multiple data exchanges may be tracked between the device and a hotspot access point while negotiating and ultimately accessing the hotspot network. Similarly, one or more radios may be used at the hotspot location to identify and tracking visiting devices. For example, multiple radios may be used at a same location to promote greater proximity data acquisition (e.g. multiple RTLS radios) and thus increase accuracy of the downstream analytics relying on such data.

FIG. 14 schematically illustrates hotspot engagement levels for characterizing a device visit at or near a given hotspot location. Namely, passive visitors 1402 may carry devices that are, at the highest level, merely detected as being present within the vicinity of the hotspot. In one example, passive device detection may occur at first level via a probe request packet capture or an RTLS detection, as discussed above, thereby directly identifying the device at or near the hotspot.

In a similar fashion, device communications may be intercepted via a third party receiver (e.g. a receiver in the area of the hotspot in question but not necessarily associated with the hotspot itself, that is, potentially operated by un unrelated entity and/or not readily accessible by the common knowledge base). For instance, a particular device may be out of range for a particular hotspot receiver to detect it, but may still communicate with another unrelated Wi-Fi transceiver, which unrelated transceiver is itself within range of the particular hotspot receiver. This example is shown schematically in FIG. 13, wherein unrelated hotspot 1307, in range of one of the system's hotspots 1306, exchanges data with a wireless device 1303 that is not within range of this system's hotspot 1306, for example, in processing a request for network access, exchanging authentication information, or managing an active network connection with the device 1303. Accordingly, while transmissions emanating from the device in question 1303 may not be captured by the particular hotspot receiver 1306 of interest, communications emanating from the unrelated transceiver 1307 and intended for the device in question may themselves be captured by the hotspot receiver 1306 and thus identify the presence of the device 1303 within the area of the hotspot 1306. Clearly, such communications would again reflect the presence of a passive visitor, but such information may nonetheless be of interest in compiling visitor analytics in respect of the hotspot location of interest 1306. Furthermore, since communications emanating from the unrelated transceiver 1307 will necessarily include reference to a specific transceiver identifier (i.e. an access point MAC distinct from the access point MAC of the hotspot location 1306 of interest), the system may be configured to automatically distinguish local (direct) from foreign (indirect) visitors, and, possibly, to perform comprehensive analytics as to the number of visitors associated with nearby locations as compared to those present at their own location (i.e. competitor intelligence could be compiled). In any event, the device may still be recognized from a previous visit at the same or another hotspot location populated in the device's stored device profile, or identified as a new device and recorded in the creation of a new device profile.

Again with reference to FIG. 13, in one illustrative embodiment, the system 1300 may further or alternatively comprise or be configured to interface with a set of Wi-Fi radio locations 1309 operatively disposed in different locations to, much as in the context of the hotspots 1306, allow the system 1300 to identify and recognize remote devices 1302 when in their general vicinity. For example, such radios 1309, while not operated to provide devices with wireless access to a network connection, may nonetheless operate to capture local transmissions sent by these devices and extract therefrom a unique device identifier (e.g. MAC address via packet capture or RTLS) to be cross-referenced with the knowledge base and, where a match is made, allow recognition of the device as being present at the given location, and otherwise allow for the creation of a new device profile. Again, given the passive nature of the intercepted wireless transmissions, such device visits would be characterized as passive visits. Regardless, valuable market data may still be compiled with respect to the devices identified at each location, as can device visit profiles be created and stored, as will be described in greater detail below. Much like device identification and recognition at an active hotspot, devices recognized at a given location that have opted-in for or authorized (directly or indirectly) the system to communicate directly therewith upon detection, may be targeted upon satisfying certain criteria, such as upon qualifying as a repeat or loyal visitor, a new visitor at a particular location, meeting certain target demographics, etc.

Active visitors 1404, on the other hand, may be progressively characterized as hotspot associated, whereby the device's radio has identified the hotspot access point and is attempting to connect; hotspot active/intercepted, in which the device is actively connected to the network but not yet authenticated for access to the Internet, for example (e.g. may yet to enter authentication credentials, temporary password, network access key, or the like); and/or hotspot authenticated, whereby a device has been authenticated for network access at the hotspot. Further engagement may also be provided, as will be described in greater detail below, by way of a user opting-in for services, promotions, applications and/or packages, for example, or merely by accepting terms and conditions laid out in exchange for free open access to the hotspot network connection, for example. Such opt-in or service access conditions may include express authorization by the user for designated system access privileges to the device and/or to user data stored thereon, or include the volunteering of user data by way of user action on the device for system storage and use. As each level of interaction provides an increasing or at least continuing ability to extract information from the device and/or to characterize the device's activity via recognizable network communications, further information can be gathered in respect of the device's user by tracking not only device identification and recognition, but also an engagement level and visit duration. Conversely, it will be appreciated that fewer and fewer visitors will be identified with increasing levels of engagement. Based on the acquired data, it may be that a given hotspot operator may attempt to increase engagement by visitors, for example by way of "network access" or "opt-in" incentives, so to increase its access to device and/or user data and thus enhance device profile analytics and applications. Irrespective, each engagement level provides the system access to recognizable device transmissions, which, in one embodiment, may include an access point MAC address (e.g. for cross-referencing hotspot location) and a device MAC address (e.g. for device recognition), and further include for association and authentication level events, an event start/stop value. Each event may also have associated with it a date/time stamp, for example. Where an RTLS module, for example, is also or alternatively used, a signal strength of the device may also be captured, thereby allowing for further characterization of the visit, namely, as a function of user proximity to the hotspot location (e.g. internal or external to the establishment providing network access), which proximity may also be logged as a component of the device visit.

In one example, and as will be further exemplified below, the system may be configured to wirelessly transmit an engagement offer to the device that requires user action on the device for implementation and that ultimately results in the system gaining enhanced communicative access to the device. Upon subsequently detecting and recognizing the device, the system may be configured to use this enhanced communicative access to automatically engage a user of the device (e.g. without user input). For example, in one embodiment, the requested user action results in the transmission of user contact information to be associated with the device profile in the knowledge base (e.g. automatically extracted from the device or directly or indirectly input by the user). Upon subsequent detection and recognition of the device at the hotspot or a related hotspot (or again at one or more passive system sensor locations, such as sensors 1309 of FIG. 13), the contact information can be accessed from the knowledge base and used to communicate a message to the device.

Similarly, the requested user action may rather or also result in the download of an application (e.g. app) associated with the hotspot location, or a designated group of hotspot locations, to be operated on the device. In doing so, a unique application identifier may be stored in relation to the device's profile and used to communicate directly with the downloaded application operating on the device when the device is subsequently identified and recognized at one of these hotspots (or related sensor locations).

In one example, a particular device visit is compiled as a series of events over time captured and logged by the system, from initial detection in one example by way of MAC address packet capture upon the device scanning for available network connections, followed by network association, interception and/or authentication upon the user gaining access to the hotspot network (which may last anywhere between a few minutes to a few hours), to termination upon the user breaking the connection, upon the system logging a final packet capture event, or again upon the user turning off the device (e.g. a laptop may be shut down before leaving the location, whereby a finalizing packet capture is not available to mark the device leaving the location, as may otherwise be available from a smartphone device or the like that remains activated as the device leaves the location). The network disconnection event, much like a final packet capture event, may therefore act as a visit closing point as the last detected action of the device at the hotspot. In this scenario, a comprehensive visit profile can be compiled from a combination of passive and active detection mechanisms to enrich the data collected as it pertains to a particular visit.

FIGS. 14B to 14D provide examples of visit profiles for a given location that may be compiled using the above considerations, which profiles may then be used to gain market intelligence on the location's clientele, to gear marketing and/or promotional efforts, to allocate resources and/or project product or service demands, and/or to target selected clients or client groups, for example. An optional visit proximity profile is overlaid on the visit timeline profile, for example rendered via proximity data extracted from an RTLS data stream, in further characterizing a device visit. Clearly, a visit proximity profile may be used independently to produce usable results, as will be further illustrated by the below-described examples. Further, while packet capture detection is considered in the below examples for device detection, an RTLS data stream may otherwise be used to provide similar effects, the added option of further capturing signal strength data to further characterize device proximity.

In the example of FIG. 14B, a uniquely identifiable device is first detected by way of packet capture (or RTLS). The device is then associated with the hotspot and later authenticated for wireless network access. Packet capture again identifies the device before the authenticated session is closed. As no further detection events take place after network disconnection, the visit is characterized by the time lapse from first detection to authenticated assess termination. Based on the duration of the visit (e.g. upon the visit duration exceeding a preset threshold), and the level of engagement recorded (e.g. authenticated access generally associated with an engaged patron), the visit is classified as an active walk-in, and thus as a likely profitable patron that may be likely to return given his lasting use of available network resources. Note that proximity data may be used in conjunction with the engagement timeline to further characterize the visit. For instance, in this example, signal strength data is processed to indicate proximity of the device as exceeding a preset proximity threshold 1450, thereby indicating a high likelihood that the device is in fact located within the hotspot operator's premises or establishment, thus confirming the visit's status as an active walk-in. Should proximity data indicate otherwise, the system could question whether the detected device is in fact making use of hotspot services without necessarily supporting the hotspot operator, and take appropriate action or log the visit accordingly. In any event, and as noted above, upon cross-referencing the device's unique identifier (e.g. the MAC address extracted upon initial detection, possibly enriched by recognizable attributes associated therewith in the device profile and associated with network access authentication) with a database of known device profiles, the visitor may further be characterized as a returning customer (e.g. if previously identified at this location or at one of several associated locations), or as a potentially new customer (e.g. if never before detected at this or related locations, but potentially previously identified and logged at an unrelated location). In any event, the visit may be recorded in the stored profile, or in a newly created device profile in the context of a new visitor heretofore never detected by the system, for recognition upon subsequent detection at this or another location.

In FIG. 14C, on the other hand, a device is briefly detected (e.g. via packet capture or RTLS), thus defining a visit more likely associated with a walk-by, namely an individual that did not necessarily patron the hotspot location. Tracking these visitors may, as will be described in greater detail below, provide information useful in drawing in such walk-by visitors, thus effectively seeking to convert them to walk-ins. In the context of this example, and where RTLS is used, proximity data may again be used in combination with event timing/visit duration data to further characterize user activity. For example, a short duration visit may be characterized as a walk-by where no further data is available, but may otherwise be characterized as a short walk-in where proximity data indicates that the device did in fact enter the premises of the hotspot operator (e.g. where proximity exceeds a preset threshold 1452). In the coffee shop example, a patron could come in and out of the coffee shop within a few minutes, but nonetheless warrant characterization of the visit as a walk-in.

Accordingly, engagement level, visit duration and proximity data may be combined, when available, to refine characterization of a device visit.

In FIG. 14D, a repeat visitor is identified for a same location (or different locations tracked as part of a same group). For instance, a first visit may include a simple passive walk-in visit (e.g. in the coffee shop example, a visitor may be stopping in to pick-up a coffee to go without intentionally engaging the hotspot network), wherein the device is first detected but never further engaged before a final detection takes place a few minutes later. Combining identification event data with proximity data, again illustratively shown in this example as a y-axis increasing with proximity to the hotspot (i.e. increasing signal strength) the system can better distinguish between a true passive walk-in event (e.g. where a proximity threshold 1454 is met) and an event in which the device, while close enough to be detected by the system, may in fact have been located outside or next door to the premises in question, or again detected via third-party communications picked-up by the hotspot radio, thereby still potentially logging-in a visit of sufficient duration to qualify as a walk-in, but in fact representing a "close" walk-by. In any event, later that day, the same device may be detected and recognized, this time further engaging the system via authenticated network access and direct engagement, characterizing the visit as an engaged repeat walk-in visit. Following from the above coffee shop example, engagement may be introduced via a product or promotional offering, whereby a user may elect to "opt-in" for a particular service via a network landing page or the like, thus exchanging further information with the system to enable or activate the opt-in service. For example, the user could select to download a free iTunes™ song in exchange for filling-in a customer loyalty form, providing their e-mail address for a chance to win a free gift or service, or again downloading a free location-specific or related app for implementation on their device, which app then readily accessible by the hotspot operator for subsequent interaction with the visitor. In this last example, a visitor accessing a hotspot location at an airport may be offered a flight status app or the like to be implemented on their device, which app may later be accessible by the hotspot or related operator to promote airport shopping or services upon detecting and recognizing the device during a subsequent visit (e.g. send a scanable coupon via the app to promote a certain shop or restaurant). Other examples may include, but are not limited to, the exchange of SMS messages, device and/or user association with the hotspot operator via a social network or the like (e.g. Facebook™ "like" status, twitter account following, etc.), etc.

Upon such engagement, not only can the system track engagement of this particular device, further information relating to the user(s) of the device, or the device itself, may be extracted, either directly as input by the user, or indirectly upon the user accepting certain terms and conditions required in receiving the opt-in service (or again required upon requesting free network access privileges). As will be described in greater detail below, acquisition of such further information can be stored and associated with the device profile, and used downstream to enhance the user's experience and promote further patronage, for example. For instance, as noted above, a repeat 'opted-in' visitor may be automatically identified and recognized upon detection, and automatically prompted by the system. Following the above-example, an opted-in visitor having provided his e-mail address may receive an automated greetings from the system, which may include a promotional incentive for the visitor to further enhance patronage of the hotspot or related location. Other examples will be provided below in respect of the embodiment described with reference to FIG. 18.

Accordingly, the system 1300, and its equivalents, may be configured to compile data in respect of each device visit to a particular hotspot, whereby visit data gathered and compiled in respect of each detected device, and optionally at different locations, may be combined to provide market intelligence as to the type of users frequenting a particular location and/or type of establishment, the amount of time spent at each location, the level of engagement with the system while at each location, and so on. Proximity data may also be used to characterize spatial movements of recognized device and further distinguish hotspot patrons from non-patron visitors. Further, through device recognition and visit profiling, evolution as to a particular device's engagement with a given hotspot location, or group of hotspots, may be tracked/monitored to evaluate the general effectiveness of measures implemented for drawing-in further patronage, for example. Data may be used specifically to evaluate engagement, and indirectly patronage by the user(s) of a particular device, or used in combination with data compiled for a select group of recognizable devices, or globally for all recognizable devices identified in respect of a particular hotspot location of group, thus drawing on averaged performance measures to systematically increasing patronage, engagement and/or exposure. Clearly, different visit profiles and characterizations may be considered within the present context without departing from the general scope and nature of the present disclosure, as can different analytics, reports, applications and features applied as a function of such profiles, as will be further described below.

With reference to FIG. 15, and in accordance with one embodiment, a detailed diagram of the various processes implemented in not only identifying and optionally recognizing a device at a hotspot, but also in characterizing a device visit and, as appropriate, outputting a related notification or report to an interested party (e.g. hotspot operator) will now be described. In this example, a device 1502 is again first identified at a hotspot or similar access point 1506 via packet capture (PCAP), for example via a PCAP listener 1512 as introduced above. It will be appreciated that while this embodiment considers the use of PCAP for device recognition, other means such as provided via an RTLS data stream may also or alternatively be used to provide similar effect, with the potential added benefit of leveraging signal strength data available via RTLS and its equivalents. The PCAP event may provide a first detection instance in a particular visit, but may also provide subsequent detection instances, for example at regular intervals as per the normal operation of the device, which may periodically probe its environment for available network connections. Other event sources, such as a syslog in the context of authenticated network access, interaction with an opt-in service or application implemented on the remote device, and the like, can also be used to enrich visit data, each such event generally handled by the M2M module 1514 by respective event listeners/handlers 1522. A visit creation and aggregation module 1524 is operatively associated with the event handlers 1522 to aggregate and store in knowledge base 1526 a visit profile for each uniquely identified device. In this particular embodiment, each visit is queued by a visit queue 1528 and processed by a data engine 1530 configured to receive, qualify and act upon compiled visit profiles, e.g. to isolate, filter and/or consolidate visits satisfying designated rules for further processing, reporting and/or action. For example, a particular visit profile may be pulled from the queue 1528 and processed through a rules engine 1532. Upon the visit profile matching a particular rule set at step 1534, the visit profile can be identified to an action engine 1536 with a particular action to be performed identified by the matching rule set, for output to the downstream consumer 1538 at step 1540. An exemplary action may include an HTTP Push Notification to the consumer, or other such reporting functions as will be illustrated in greater detail below.

Different illustrative rules may include, but are not limited to, rules for characterizing a selected visit as a function of preset conditions, such as duration and/or proximity (e.g. walk-in vs. walk-by), level of engagement (e.g. passive vs. active), type of engagement (e.g. detected vs. authenticated vs. opt-in device), opt-in status, etc.; rules for identifying visitors (e.g. opted-in visitors, return visitors, new visitors, long duration visitors) to whom targeted content may be pushed and/or with whom direct interaction should be promoted; reporting rules based on one or more visit qualifiers set as being of particular interest to the downstream consumer; etc. As will be appreciated by the skilled artisan, and as introduced above, rules may be set as a function of preset thresholds (e.g. proximity threshold or range, duration threshold or range, visit frequency and/or range, etc.), whereby cross-referencing of real-time and/or device/visit profile data with such thresholds may allow for adequate characterization of the device, its user, and their visit at the hotspot or similar location.

Figure 16:
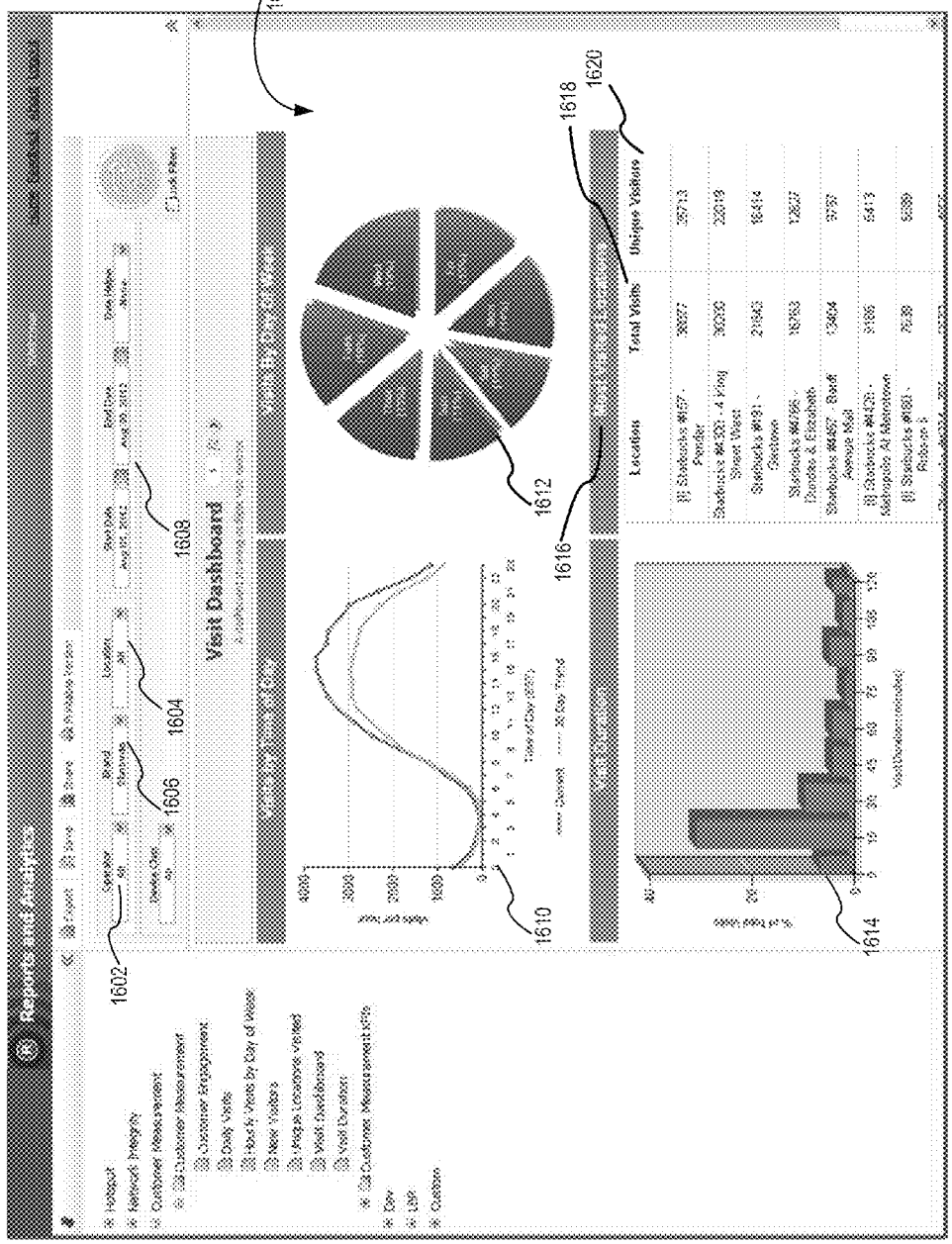
FIG. 16 is an exemplary screenshot of a system reports and analytics site consolidating visit and device-related data accessed over time in respect of a plurality of participating hotspots and/or hotspot operators.

With reference to FIG. 16, and in accordance with one embodiment, an illustrative data management interface 1600 will now be described. In this example, a consolidated management interface can be provided to consolidate device identification and recognition data, report and analyse device activity and visit patterns, and so on. In this particular example, data is isolated for all operators 1602 and locations 1604 of a selected Brand 1606, such as Starbucks™, for example, and that, for a selected date range 1608. Accordingly, aggregated data will be consolidated to present average activity data for all participating locations of this particular Brand, in this particular example, formatted to represent a visit dashboard (e.g. a selected subset of "at-a-glance" visit analytics for the selected period).

In the selected view, a chart 1610 is provided tracking visits per hour during the course of a day, and comparing average visits over the selected data range (30 day trend) to current data (real-time tracking), thus visually identifying a current above-average number of visits per hour across all locations. A pie chart 1612 is also provided breaking down percentage total visits by day. A bar graph 1614 shows a percentage distribution of visits as a function of visit duration, showing a significant fraction of visits lasting approximately 15 minutes. A breakdown of visits per most-visited locations 1616 is also provided, distinguishing Total Visits 1618 from Unique Visitors 1620 (i.e. collapsing repeat visitors). Other features and applications are also made available in the illustrated interface, including options for consolidating data on: Visit duration analytics; Unique location visit analytics; New visitor analytics; Day by day hourly visit analytics; Daily visits analytics; and Customer engagement analytics, to name a few.

Figure 17A:
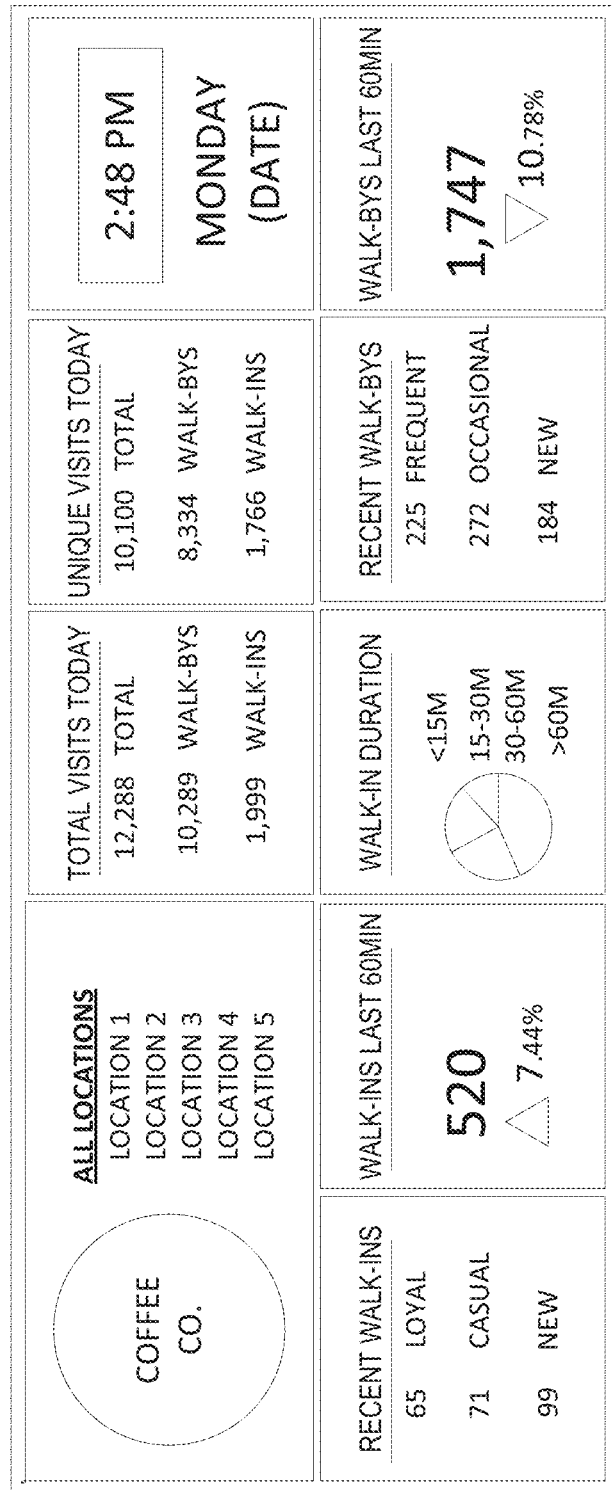
FIGS. 17A and 17B are exemplary graphical user interfaces providing a real-time dashboard of device and visit-related data in respect of multiple hotspots operated by a common hotspot operator, and in respect of a single hotspot, respectively, in accordance with one embodiment of the invention.
Figure 17B:
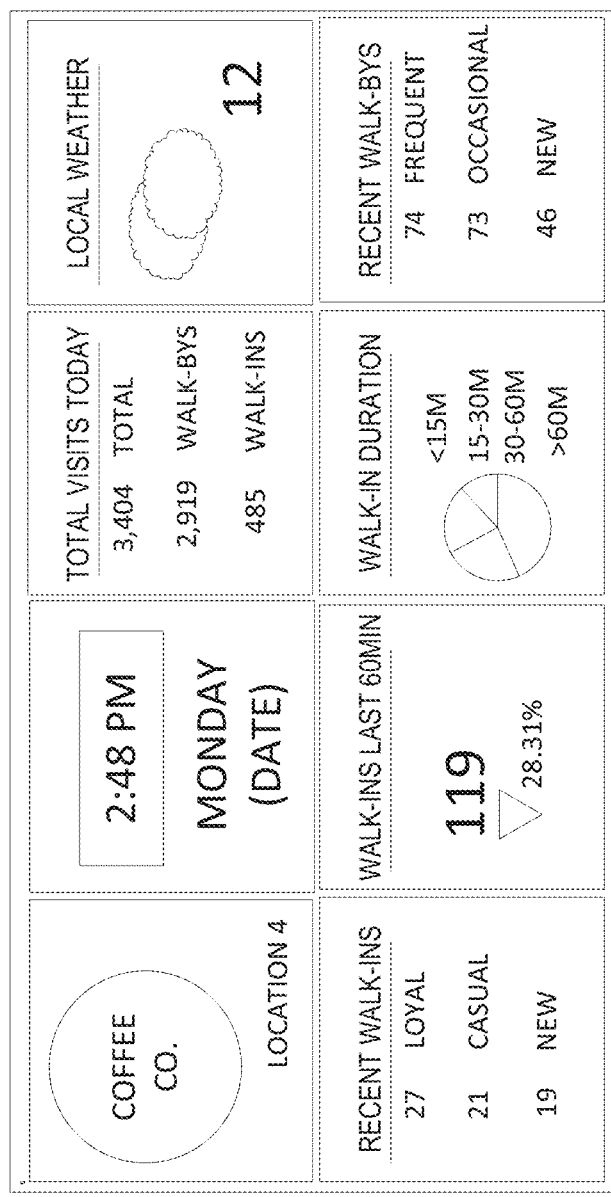

With reference to FIGS. 17A and 17B, regional and location-specific dashboards are respectively represented. In the regional dashboard of FIG. 17A, data is compiled and displayed in respect of 5 designated locations in a given area. Selected data windows include the total number of visits for the day further subdivided as walk-bys (visits lasting less than 5 minutes in one example, thus suggestive that the user of the device may not have actually entered the premises, or again optionally further characterized by a visit during which device identification events were combined with proximity data to confirm that the device never entered the premises), and walk-ins (visits lasting more than 5 minutes). Another selected window includes the total number of unique visits for the day (i.e. taking into account those making multiple visits, which may include those walking by repeatedly and thus being detected and recognized as such), again subdivided in to walk-ins and walk-bys. Another selected window classify recent walk-ins (e.g. visits detected to last more than 5 minutes) as loyal, casual or new visitors (e.g. based on preset loyalty rules). For example, devices recognized to attend one of the regional locations at least twice a week may be categorized as a loyal visitor, as compared to one recognised to attend only twice a month and thus characterized as casual. Similarly, recent walk-bys may also be characterized as such. Respective windows are also provided in this example to show a number of walk-ins within the last hour and an comparative indicia identifying a percent change in this value as compared to the previous hour; a number of walk-bys within the last hour and an comparative indicia identifying a percent change in this value as compared to the previous hour; and a pie chart tracking walk-in visit durations for the day in progress.

In the location-specific dashboard of FIG. 17B, data is compiled and displayed in respect of a singular location. Selected data windows in this example are similar to those depicted in the embodiment of FIG. 17A, with data necessarily representative of visitor traffic and activity within a single location.

Using substantially real-time data, as illustrated in FIGS. 17A and 17B, and at a higher level in FIG. 16, a hotspot operator may proceed to make educated decisions as to how to market or promote their services, namely in seeking to attract further clientele (e.g. investigate options for drawing in walk-bys, and particularly repeat walk-bys that may, for instance, be predicted to frequent a competing establishment in the area), and/or to better service existing clientele and encourage further engagement. Using real-time and/or regular data updates a local or regional operator may track immediate results to different marketing or promotional campaigns aimed at improving patronage. For example, a local coffee house hotspot operator may observe that walk-ins drop significantly during certain periods of the day or again on certain days, and investigate potential reasons therefore, which may lead to creative solutions to draw in greater patronage at those times or on those days. Similarly, peak walk-by periods may suggest the use of a more aggressive sidewalk promotion strategy around those periods to draw these visitors in. Other considerations may rely on acquired device profile data to plan for services and demand on given days, or during certain periods of the day. For example, while sales receipts may allow tracking of variable demand patterns, visit duration data may allow for greater insight as to physical space allowances, visitor comfort (i.e. would increasing visitor comfort or improving visitor environment help prolong visit durations and boost sales, or hinder flow through of new walk-ins).

Similarly, given the potential real-time nature of the acquired data, immediate reporting or push notifications may be dispatched to the location in question to incite immediate action. For example, where walk-in rates show a significant drop over the course of the last hour, a location manager may immediately evaluate conditions that may have led to such decrease (e.g. overcrowded space or limited seating, shortage on certain menu items for a coffee shop or restaurant, loud or unpopular background music, disturbingly loud group of patrons, etc.). Access to such immediate observations on patronage and engagement may thus lead to faster identification and remediation of perceived issues, or again to noting particular characteristics or settings seemingly conducive to an increase in patronage (e.g. live music, effective sidewalk advertising, personal greeter at the door, etc.).

Similarly, the immediate identification and recognition of repeat patrons may trigger a more receptive or dedicated service, as can recognition of "opt-in" devices at a given location be used to push instant notifications to those devices or again to service providers/sales representatives at the location to encourage provision of enhanced services, communicate a "usual" order to the cashier before an order is actually made, or simply allow for a personal greeting to a "regular" who may otherwise expect to be personally recognized by location.

Accordingly, the compilation of such data may allow for direct or indirect reporting of business intelligence metrics and/or analytics which may be utilised to adjust or refine business practices and/or offerings and to observe immediate, short and/or long term effects of such refinements on the business's clientele and performance. As noted above, reports may be rendered "at-a-glance" in the form of comprehensive and/or customizable dashboards, as instant notifications, or alternatively rendered as detailed business intelligence reports for detailed analysis.

Reporting can also take different forms depending on the intended analysis to be performed and intended outcome and application of such analyses. For example, data may be compiled to provide location segmentation reporting, such as to determine and illustrate a mix of devices recognized at a given location or group of locations (e.g. number of loyal/regular/occasional/new customers at a given time or during a given period). Data may also or alternatively be compiled to provide device segmentation reporting, such as to qualify the visit patterns of a particular device (e.g. Loyal/Regular/Occasional/etc.). Where a device has been opted-in to a particular service offering in exchange for the rights to disseminate, exchange and/or use the device's user's personal data (e.g. demographics) and/or communication streams (e.g. e-mail, SMS, social network, etc.), reports may also, or alternatively include specifics extracted from the device and/or user indicative of the user's gender, age, past purchase history, visit profiles, social status, etc. On the latter, further details and examples as to the various manners by which social data may be extracted, combined and bound with a user's device profile can be found in Applicant's co-pending United States Patent Application No. 2012/0192258, the contents of which are hereby incorporated herein by reference in their entirety. It will be appreciated that other types of reports may be considered herein, as can different permutations and combinations thereof, without departing from the general scope and nature of the present disclosure. The above also provides a few illustrative examples as to different applications to device identification, recognition, and tracking. Other such applications are clearly intended to fall within the general scope and nature of the present disclosure, as will be further detailed below.

Figure 18:
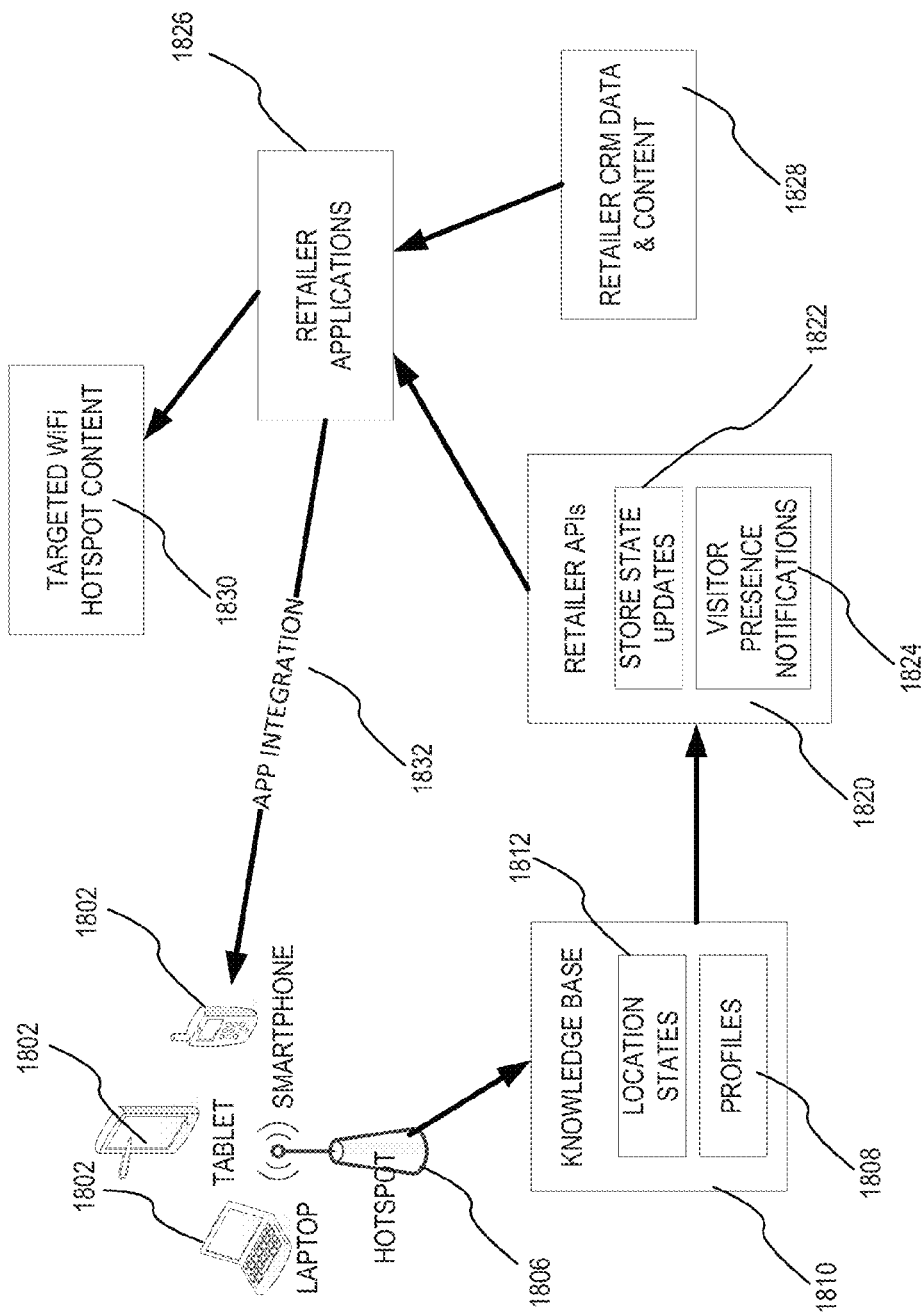
FIG. 18 is a diagrammatic representation of illustrative downstream applications for a device detection and recognition system, in accordance with one embodiment of the invention.

With reference now to FIG. 18, and in accordance with some embodiments, illustrative downstream applications for a device detection and recognition system will now be described. In this example, wireless devices 1802 at a given hotspot or similar location 1806 may be detected and respective device profiles 1808 created and/or populated in knowledge base 1810 to track and report on device activity at this location. A respective location state 1812 is generally associated with each device profile instance, along with a timestamp or the like, as noted above, to ultimately characterize device presence/activity, location and timelines (e.g. visits) for further processing. In this embodiment, knowledge base data is made accessible to a consumer through a retailer API 1820, or the like, so to update store (location) states 1822 and provide visitor presence notifications 1824, for example. For instance, store state updates 1822 may include, but are not limited to, the push or pull of global, regional and/or local visitor dashboard updates, or the like, so to allow for the substantially real-time processing of visitor activity data in extracting immediate or near immediate market intelligence. In some embodiments, immediate action may be initiated as a function of store updates, such as the application of instantaneous promotions, service upgrades, or again, in increasing network access coverage and/or capacity where visitor updates are indicative of an increased demand for network access, for example. Long term projections and analytics may also or alternatively be compiled based on updated data compiled over time.

In this example, the retailer API 1820 communicates with one or more retailer applications 1826, which may also access retailer CRM data and content 1828 to supplement interactions with visitors at the hotspot location(s). For example, retailer applications 1826 may be configured to provide targeted Wi-Fi hotspot content 1830 to visitors, namely visitors actively engaged via network authentication or opt-in visitors readily accessible, for example, by way of contact data or information volunteered by the visitor during the opt-in process (e.g. social network interface/account-related content, web content or pop-up advertising, foreground inset content, background content, etc.). Additionally, or alternatively, targeted content may be pushed via retailer app integration 1832 on the visiting device, for example once downloaded upon opting-in for related services. Other examples of pushed or targeted content may include the sending of an e-mail or SMS message, for example, where such contact information has been volunteered or extracted and used under approval by the user of the device, again, possibly in the context of network engagement at a given hotspot.

For example, a device may opt-in to receive promotional information form an airline and its affiliates upon using the airline's network access services in their first class waiting lounge. Following from this example, the airline may be affiliated with a hotel chain such that, upon the user's device being detected at the airport lounge prior to leaving for a flight, the device owner's flight information may be retrieved by cross-referencing the user's e-mail as provided during the opt-in process for receiving promotional information, with an e-mail contact field associated with the user's flight ticket. Accordingly, the user's destination for that day may also be identified, allowing for targeted content associated with this destination (e.g. hotel chain location at the user's destination) to be pushed to the user. In a similar manner, upon the user's device being detected and recognized in the lobby at a given hotel chain location associated with the opt-in airline, a targeted message could be sent to the device welcoming the user and offering one or more promotional incentives, such as a room upgrade, complimentary breakfast, or the like.

As will be appreciated by the skilled artisan, from implementation of device location and recognition at different hotspot or similar locations within a given network as described above, and further by optionally tracking device engagement levels, visit profiles, and opt-in statuses and the like, myriad applications may be implemented to leverage the information gathered, tracked and compiled in real-time and/or over time to enhance network user experience, customer targeting, promotional efforts, operational projections, cross-partnership or affiliation advertising, to name a few.

While the present disclosure describes various exemplary embodiments, the disclosure is not so limited. To the contrary, the disclosure is intended to cover various modifications and equivalent arrangements included within the general spirit and scope of the present disclosure.

The invention claimed is:

1. A method for recognizing a wireless device across multiple hotspot locations, the method comprising:
   detecting at one of the multiple hotspot locations a wireless transmission sent by the wireless device;
   extracting a unique device identifier of the detected device from said wireless transmission, said unique device identifier automatically embedded within said wireless transmission by the detected device without user input;
   cross-referencing said extracted device identifier with a network accessible database of stored device profiles, each of said device profiles having a respective stored device identifier associated therewith;
   recognizing the detected device upon matching said extracted device identifier with one said stored device identifier; otherwise
   automatically creating a new device profile in said database as a function of said extracted device identifier such that the device is recognized upon subsequent detection at any of said multiple hotspot locations;
   automatically detecting and recognizing one or more subsequent wireless transmissions sent by the wireless device while at said one hotspot location;
   characterizing a visit profile of the device as a function of said subsequent wireless transmissions, said visit profile at least characterized by or as a function of a duration value defined by a time period between a first recognized transmission and a last recognized transmission;
   associating said visit profile with said device profile;
   classifying said duration in accordance with two or more preset visit duration classifications;
   compiling for a given hotspot location or for a designated group of said hotspot locations, and for a designated reporting time period, a number or a percentage of said recognized devices classified in accordance with at least one of said classifications over said time period; and
   outputting said number, said percentage or an indicia representative thereof.

2. The method of claim 1, further comprising:
   tracking the device via said device profile to recognize returning devices at a same hotspot.

3. The method of claim 2, further comprising:
   automatically identifying users of said returning devices as frequent or loyal customers.

4. The method of claim 3, further comprising:
   automatically offering preferential services to said frequent or loyal customers via said returning devices.

5. The method of claim 1, further comprising:
   providing the device access to an available network connection at said one hotspot; and
   accessing additional data distinct from said unique device identifier from said device upon said device accessing said available network; and
   associating said additional data with said device profile.

6. The method of claim 5, further comprising:
   accessing said additional data associated with said device profile upon subsequently recognizing said device at any of said multiple hotspots; and
   tailoring user experience via the device as a function of said additional data.

7. The method of claim 1, further comprising:
   identifying a location of said hotspot;
   associating said location with said device profile; and
   tracking at least one of usage location patterns of the device and usage by location for multiple devices via said device profiles.

8. The method of claim 1, said device identifier comprising a value indicative of an inherent characteristic of the device.

9. The method of claim 8, said inherent characteristic comprising a MAC address of the device.

10. The method of claim 1, wherein said wireless transmission comprises a scanning transmission scanning for an available network connection at said one hotspot.

11. The method of claim 10, wherein said scanning transmission comprises a probe request automatically transmitted by the device in scanning for the available network connection, and wherein said extracting comprises extracting a MAC address of the device from said probe request.

12. The method of claim 1, wherein at least some of the hotspot locations are commonly associated with a same hotspot operator, the method further comprising:
   tracking the device via said device profile to recognize returning devices to any one of the commonly associated hotspots; and
   identifying users of said returning devices as frequent or loyal customers to said hotspot operator.

13. The method of claim 12, further comprising:
   automatically offering preferential services to said frequent or loyal customers via said returning devices.

14. The method of claim 1, further comprising:
   compiling for a given hotspot location or for a designated group of said hotspot locations, and for a designated reporting time period, at least one of a number of recognized devices uniquely identified during said time period and a number of recognized devices multiply identified during said time period; and
   outputting said at least one number or an indicia representative thereof.

15. The method of claim 1, further comprising:
   compiling for a given hotspot location or for a designated group of said hotspot locations, and for a designated reporting time period, a number or a percentage of said recognized devices identified over said time period satisfying a preset loyalty threshold defined by a number of recognized device visits at said given hotspot location or at any one of said designated group of said hotspot locations over a preset time period; and
   outputting said number, said percentage or an indicia representative thereof.

16. The method of claim 1, further comprising characterizing said visit profile as a walk-in visit upon said duration exceeding a preset threshold, and otherwise characterizing said visit profile as a walk-by.

17. The method of claim 1, wherein at least one of said subsequent wireless transmissions is sent by the device to actively engage a network connection available at said one hotspot.

18. The method of claim 17, wherein said at least one of said subsequent transmissions comprises at least one of a request for wireless access to said network connection, a request for authentication for said wireless access and a request for access to network resources via said network connection post-authentication.

19. The method of claim 17, further comprising characterizing said visit as a function of an engagement level of said recognized device during said visit.

20. The method of claim 1, further comprising:
   classifying the device in accordance with two or more preset loyalty classifications defined by a number of recognized visits by the device at said given hotspot location or at any one of a designated group of said hotspot locations over a preset time period;

further compiling for said given hotspot location or for said designated group, and for said designated reporting time period, a loyalty number or a loyalty percentage of said recognized devices classified in accordance with at least one of said loyalty classifications over said reporting time period; and outputting said loyalty number, said loyalty percentage or a loyalty indicia representative thereof.

21. The method of claim 1, further comprising:
automatically detecting a signal strength of the device;
calculating a proximity of the device as a function of said signal strength; and
further characterizing said visit profile as a function of said proximity.

22. The method of claim 1, further comprising:
automatically detecting a signal strength of the device;
calculating a proximity of the device as a function of said signal strength;
characterizing a visit profile of the device as a function of said proximity; and
associating said visit profile with said device profile.

23. The method of claim 22, wherein said characterizing as a function of said proximity comprises:
comparing said proximity with one or more proximity thresholds; and
classifying said visit profile in accordance with said proximity satisfying a given one of said one or more thresholds.

24. The method of claim 1, further comprising
wirelessly transmitting an engagement offer to the device, said engagement offer requiring user action on the device for implementation, said action resulting in enhanced communicative access to the device; and
upon subsequently detecting the device, using said enhanced communicative access to automatically engage a user of the device without user input.

25. The method of claim 24, said action resulting in transmission of user contact information, the method further comprising:
receiving and storing said transmitted user information in association with said device profile; and
upon subsequently detecting the device, automatically communicating a message to the device via said contact information.

26. The method of claim 24, said action resulting in download of an application associated with said hotspot location, a designated group of said hotspot locations, or all said hotspot locations, to be operated on the device, the method further comprising:
associating a unique application identifier with said device profile, said unique application identifier usable in communicating directly with said application operating on the device; and
upon subsequently detecting the device, automatically communicating a message to the device via said application.

27. The method of claim 1, further comprising:
detecting at said one of the multiple hotspot locations a sent wireless transmission sent to an other wireless device by a distinct hotspot location within range of said one of the multiple hotspot locations;
extracting an other unique device identifier of the detected other device from said sent wireless transmission, said other unique device identifier automatically embedded within said sent wireless transmission without user input;
cross-referencing said extracted other device identifier with said network accessible database of stored device profiles; and
recognizing said other detected device upon matching said extracted other device identifier with one said stored device identifier; otherwise
automatically creating a new device profile in said database as a function of said extracted other device identifier.

28. The method of claim 1, further comprising:
detecting at a passive Wi-Fi receiver location a wireless transmission sent by the device;
extracting said unique device identifier to recognize the device; and
logging a device visit at said receiver location in said device profile.

29. A system for tracking wireless devices across multiple hotspot locations, the system comprising:
a network accessible database having stored therein a plurality of device profiles each identifying a respective wireless device by a stored unique device identifier, each said stored unique device identifier indicative of an inherent characteristic of said respective device; and
a network access module, comprising one or more hardware processor, at each of said locations and configured to detect at a given location a wireless transmission sent from a given device and having embedded therein a transmitted unique device identifier inherent to said given device;
said network access module interfacing with said network accessible database to cross-reference said transmitted unique device identifier with said plurality of device profiles to identify a matching profile and thereby recognize said given device, and otherwise automatically create a new device profile based on said transmitted unique device identifier so to recognize said given device upon subsequent detection at any of said multiple hotspot locations;
said network access module further detecting and recognizing one or more subsequent wireless transmissions sent by the wireless device while at said one hotspot location;
wherein the system automatically characterizes a visit profile of the device as a function of said subsequent wireless transmissions, said visit profile at least characterized by or as a function of a duration value defined by a time period between a first recognized transmission and a last recognized transmission;
associates said visit profile with said device profile in said network accessible database;
classifies said duration in accordance with two or more preset visit duration classifications;
compiles for a given hotspot location or for a designated group of said hotspot locations, and for a designated reporting time period, a number or a percentage of said recognized devices classified in accordance with at least one of said classifications over said time period; and
outputs said number, said percentage or an indicia representative thereof.

30. The system of claim 29, wherein said network access module comprises a gateway configured to intercept said wireless transmission and redirect same to a network accessible processor programmed to extract said transmitted identifier and cross-reference same with said device profiles.

31. The system of claim 29, wherein a time and said given location are associated with said matching profile to automatically identify returning devices at said given location.

32. The system of claim 31, further comprising a service access module configured to offer preferential services to returning devices via said network access module.

33. The system of claim 29, wherein said inherent characteristic comprises a MAC address.

34. The system of claim 29, wherein said wireless transmission comprises a probe request automatically transmitted by said given device in scanning for an available network connection and having embedded therein said inherent characteristic, said inherent characteristic being a MAC address of said given device.

35. The system of claim 29, further comprising a packet listener interfacing with said network access module and said database to extract said transmitted identifier for cross-referencing with said device profiles.

36. A method for automatically characterizing a device visit at a Wi-Fi location, comprising:
   detecting a first wireless transmission sent by a wireless device;
   extracting a unique device identifier of the detected device from said wireless transmission, said unique device identifier automatically embedded within said wireless transmission by the detected device without user input;
   creating a device visit profile and associating said extracted unique device identifier therewith;
   recording a timestamp of said first wireless transmission in said device visit profile;
   automatically identifying one or more subsequent wireless transmissions sent by said wireless device while at the Wi-Fi location by way of identifying data associated with each of said subsequent transmissions;
   recording a timestamp of each of said subsequent transmissions in said device visit profile; and
   characterizing said device visit profile at least as a function of a duration value defined by said recorded timestamp of said first transmission and a recorded timestamp of a last of said subsequent transmissions;
   classifying said duration in accordance with two or more preset visit duration classifications;
   compiling for a designated reporting time period a number or a percentage of said visit profiles classified in accordance with at least one of said classifications over said time period; and
   outputting said number, said percentage or an indicia representative thereof.

37. The method of claim 36, further comprising characterizing said visit profile as a walk-in visit upon said duration exceeding a preset threshold, and otherwise characterizing said visit profile as a walk-by.

38. The method of claim 36, wherein said Wi-Fi location comprises a hotspot location, and wherein at least one of said subsequent wireless transmissions is sent by said device to actively engage a network connection available at the hotspot location.

39. The method of claim 38, wherein said at least one of said subsequent transmissions comprises at least one of a request for wireless access to said network connection, a request for authentication for said wireless access and a request for access to network resources via said network connection post-authentication.

40. The method of claim 39, further comprising characterizing said visit as a function of an engagement level of said recognized device during said visit.

41. The method of claim 36, further comprising:
   cross-referencing said extracted device identifier with a network accessible database of stored device profiles, each of said device profiles having a respective stored device identifier associated therewith;
   recognizing the detected device upon matching said extracted device identifier with one said stored device identifier; and
   associating said visit profile with said device profile.

42. The method of claim 36, wherein said first transmission comprises a probe request transmitted by the device upon scanning for an available network connection at the Wi-Fi location, and wherein said device identifier comprises a MAC address of the device automatically embedded within said probe request.

43. The method of claim 36, further comprising:
   automatically detecting a signal strength of the device;
   calculating a proximity of the device as a function of said signal strength; and
   further characterizing said visit profile as a function of said proximity.

44. The method of claim 43, wherein said characterizing as a function of said proximity comprises:
   comparing said proximity with one or more proximity thresholds; and
   classifying said visit profile in accordance with said proximity satisfying a given one of said one or more thresholds.

45. A method for recognizing a wireless device across multiple Wi-Fi locations, the method comprising:
   detecting at one of the multiple Wi-Fi locations a wireless transmission sent by the wireless device;
   extracting a unique device identifier of the detected device from said wireless transmission, said unique device identifier automatically embedded within said wireless transmission by the detected device without user input;
   cross-referencing said extracted device identifier with a network accessible database of stored device profiles, each of said device profiles having a respective stored device identifier associated therewith;
   recognizing the detected device upon matching said extracted device identifier with one said stored device identifier;
   associating with said device profile of said recognized device said one of the multiple Wi-Fi locations;
   centrally compiling from said stored device profiles, visit data for each of said multiple Wi-Fi locations;
   detecting one or more subsequent wireless transmissions sent by said wireless device while at the one of the multiple Wi-Fi locations;
   creating a visit profile for said recognised device at said one of multiple locations, said visit profile at least characterized by or as a function of a duration value defined by a time period between a first recognized transmission and a last recognized transmission;
   classifying said duration in accordance with two or more preset visit duration classifications;
   compiling for a given Wi-Fi location or for a designated group of the multiple Wi-Fi locations, and for a designated reporting time period, a number or a percentage of said recognized devices classified in accordance with at least one of said classifications over said time period; and
   outputting said number, said percentage or an indicia representative thereof.

* * * * *